(12) United States Patent
Araki et al.

(10) Patent No.: US 6,713,183 B2
(45) Date of Patent: *Mar. 30, 2004

(54) FLUORINE-CONTAINING ADHESIVE AND ADHESIVE FILM AND LAMINATED ARTICLE PRODUCED BY USING SAME

(75) Inventors: Takayuki Araki, Settsu (JP); Yoshito Tanaka, Settsu (JP); Masahiro Kumegawa, Settsu (JP); Noritoshi Oka, Settsu (JP); Tetsuo Shimizu, Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,941

(22) PCT Filed: Dec. 5, 1996

(86) PCT No.: PCT/JP96/03576

§ 371 (c)(1),
(2), (4) Date: Jun. 5, 1998

(87) PCT Pub. No.: WO97/21779

PCT Pub. Date: Jun. 19, 1997

(65) Prior Publication Data

US 2003/0194564 A1 Oct. 16, 2003

(30) Foreign Application Priority Data

Dec. 8, 1995 (JP) .............................................. 7/320573

(51) Int. Cl.⁷ .......................... B32B 27/08; B32B 27/30; B32B 31/00
(52) U.S. Cl. .......................... 428/421; 428/422; 156/333
(58) Field of Search ............................... 526/247, 249, 526/255, 242; 428/421, 422, 463; 156/333

(56) References Cited

U.S. PATENT DOCUMENTS

| | | | | |
|---|---|---|---|---|
| 4,166,165 A | * | 8/1979 | Hisasue et al. | 526/87 |
| 4,544,720 A | * | 10/1985 | Ohmori et al. | 526/247 |
| 4,749,607 A | * | 6/1988 | Ochiumi | 428/215 |
| 5,230,954 A | * | 7/1993 | Sakamoto et al. | 428/332 |
| 5,374,683 A | | 12/1994 | Morgan | 525/200 |
| 5,670,593 A | * | 9/1997 | Araki et al. | 526/245 |
| 5,908,704 A | * | 6/1999 | Friedman et al. | 428/426 |

FOREIGN PATENT DOCUMENTS

| | | |
|---|---|---|
| EP | 0 728 776 A1 | 8/1996 |
| JP | 4-249507 A | 9/1992 |
| JP | 5-247305 A | 9/1993 |
| JP | 6-115000 A | 4/1994 |
| JP | 7-145362 A | 6/1995 |
| JP | 7-506602 A | 7/1995 |
| JP | 7-228848 A | 8/1995 |
| JP | 61-188143 A | 8/1996 |
| WO | WO 95/33782 | 12/1995 |

OTHER PUBLICATIONS

Loudon, Organic Chemistry, Second Edition, p. 164, Dec. 1988.*

Encyclopedia of Polymer Science and Engineering, vol. 3: Coating Methods, p. 552, Nov. 1985.*

* cited by examiner

Primary Examiner—Ramsey Zacharia
(74) Attorney, Agent, or Firm—Kubovcik & Kubovcik

(57) ABSTRACT

To provide a fluorine-containing adhesive which maintains thermal resistance, chemical resistance, weather resistance and electric insulating property and has strong adhesive property directly to substrates particularly metal and glass, and an adhesive film and laminated article which are obtained by using the fluorine-containing adhesive. There is used a fluorine-containing ethylenic polymer having hydroxyl which is prepared by copolymerizing 0.05 to 30% by mole of at least one of fluorine-containing ethylenic monomers having hydroxyl and 70 to 99.95% by mole of at least one of fluorine-containing ethylenic monomers copolymerizable with the above-mentioned monomer.

32 Claims, 9 Drawing Sheets

1 SUS Plate
2 Hydroxyl-containing PFA Film
3 PFA Film having no Functional Group
4 Polyimide Film 5 Glass Plate
6 Polycrystal Silicon Plate 7 Aluminium Plate 8 Film of Fluorine-containing Copolymer Prepared by using Non-fluorine-containing Monomer having Functional Group

FLUORINE-CONTAINING ADHESIVE AND ADHESIVE FILM AND LAMINATED ARTICLE PRODUCED BY USING SAME

TECHNICAL FIELD

The present invention relates to a fluorine-containing adhesive which can be adhered firmly to various substrates of inorganic and organic materials, and relates to an adhesive film and laminated article which are produced by using the adhesive.

BACKGROUND ART

Hitherto fluorine-containing polymers have been used for various applications because of their excellent thermal resistance, chemical resistance, weather resistance, surface characteristics (low friction property) and electric insulating property.

On the contrary fluorine-containing polymers are generally insufficient in mechanical properties and dimensional stability, and high in price.

In order to make the best use of merits of the fluorine-containing polymer and minimize its disadvantages, investigations have been made with respect to adhesion of the fluorine-containing polymer to inorganic and organic materials and lamination of fluorine-containing polymer layer.

However the fluorine-containing polymer inherently has low adhesive force, and it is difficult to adhere the fluorine-containing polymer directly to other material (substrate). Even if the adhering is tried by thermo processing, adhesive strength of the fluorine-containing polymer is not enough, or even if the polymer has adhesive force to a certain extent, such an adhesive force is apt to vary depending on kind of the substrate. Thus in many cases, reliability on the adhesive strength of the fluorine-containing polymer has been not enough.

In order to adhere the fluorine-containing polymer to other material, there have been studied mainly the following methods:

1. a method for physically roughening a surface of substrate by sand blasting, etc.,
2. a method for surface-treating a fluorine-containing polymer by sodium etching, plasma treatment, photochemical treatment, etc.,
3. a method for adhering by using an adhesive, and other methods.

With respect to the methods 1 and 2 above, surface-treating steps are required, and the steps are complicated and productivity is poor. Also kinds and shapes of substrates are restricted. The fluorine-containing polymer inherently has low adhesive force, and there easily occur problems with appearance (coloring and flaw) of a laminated article.

Use of an adhesive in the method 3 above has also been discussed. A usual hydrocarbon type adhesive does not have enough adhesive property and its thermal resistance is insufficient. Thus a hydrocarbon type adhesive cannot stand under conditions for adhering of a fluorine-containing polymer, which requires molding and processing at high temperature, and peeling due to decomposition of the adhesive and coloring occur. Since the above-mentioned laminated article produced by using an adhesive also is insufficient in thermal resistance, chemical resistance and water resistance, its adhesive force cannot be maintained due to change in temperature and environment, and the laminated article lacks in reliability with respect to its adhesive property.

On the contrary, adhesion by using an adhesive and adhesive composition comprising a fluorine-containing polymer having functional group are discussed.

For example, it is reported that a grafted polymer prepared by graft-polymerizing, to a fluorine-containing polymer, a hydrocarbon monomer which has carboxyl represented by maleic anhydride and vinyltrimethoxysilane, a residual group of carbonic acid, epoxy or a hydrolizable silyl group, is used as an adhesive (for example, JP-A-7-18035, JP-A-7-25952, JP-A-7-25954, JP-A-7-173230, JP-A-7-173446, JP-A-7-173447) and that an adhesive composition comprising a fluorine-containing copolymer prepared by copolymerizing a hydrocarbon monomer having such a functional group as hydroxyalkyl vinyl ether with tetrafluoroethylene or chlorotrifluoroethylene and an isocyanate hardening agent is cured and used as an adhesive between vinyl chloride and corona-discharged ETFE (JP-A-7-228848).

The above-mentioned adhesive or adhesive composition comprising a fluorine-containing polymer prepared by graft-polymerizing or copolymerizing a hydrocarbon monomer having functional group does not have enough thermal resistance, and thus at the time of processing together with a fluorine-containing resin at high temperature or during use at high temperature, decomposition and foaming occur, thereby causing reduction of adhesive strength, peeling and coloring. In case of the adhesive composition disclosed in JP-A-7-228848, it is necessary to corona-discharge the fluorine-containing resin.

Further it is reported that a fluorine-containing polymer having functional group and prepared by copolymerizing perfluoro(vinyl ether) compound containing sulfonic acid, carbonic acid or derivatives thereof and a fluorine-containing monomer is used for an adhesive and adhesive composition. In the specification of U.S. Pat. No. 4,916,020, there is disclosed a laminated article produced by using, as an adhesive, a fluorine-containing polymer having functional group introduced by copolymerizing a perfluoro(vinyl ether) having sulfonic acid group, carbonic acid group or their derivatives and tetrafluoroethylene. In this laminated article, an inorganic material such as metal is surface-treated with an epoxy resin, etc.

JP-A-7-145362 discloses adhesion between a terpolymer of perfluoro(vinyl ether) having sulfonic acid group, tetrafluoroethylene and perfluoro(alkyl vinyl ether) and metal. An adhesive comprising such a fluorine-containing polymer, in which a sulfonic acid group or carbonic acid group is introduced, has insufficient adhesive property to metal, and since the functional group is strongly acidic, there is a problem of causing corrosion of metal on an adhering surface.

Also carbonic acids are in general easy to decompose at high temperature, and at the time of processing at high temperature and during use, easily cause adhesion failure, foaming, coloring, peeling, etc.

In case where the laminated articles produced by using those adhesives are used for electrical materials, since the above-mentioned functional group is introduced in a fluorine-containing polymer and the polymer is ionic, there is a problem such that electric insulating property is greatly lowered.

Further those polymers generally have high water absorption property, and laminated articles produced by using these polymers as an adhesive have poor water resistance. Also because of high water absorption property, it is not proper to use the laminated articles for applications in the electrical and electronic fields where fluorine-containing polymers are used widely.

An object of the present invention is to solve the abovementioned problems, and provide a fluorine-containing adhesive which can give firm adhesion directly to substrates such as metal and glass while maintaining excellent characteristics such as thermal resistance, chemical resistance, weather resistance and electric insulating property of a fluorine-containing polymer, and an adhesive film and laminated article which are produced by using the fluorine-containing adhesive.

DISCLOSURE OF THE INVENTION

The present invention relates to a fluorine-containing adhesive comprising a fluorine-containing ethylenic polymer having hydroxyl and prepared by copolymerizing:

(a) 0.05 to 30% by mole of at least one of fluorine-containing ethylenic monomers having hydroxyl and (b) 70 to 99.95% by mole of at least one of fluorine-containing ethylenic monomers having no hydroxyl and being copolymerizable with the component (a).

In the present invention, it is preferable that the above-mentioned fluorine-containing ethylenic monomer (a) having hydroxyl is at least one of monomers represented by the formula (1):

$$CX_2=CX^1-R_f-CH_2OH \qquad (1)$$

wherein X and $X^1$ are the same or different and each is hydrogen atom or fluorine atom, $R_f$ is a divalent alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Further it is preferable in the present invention that the above-mentioned fluorine-containing ethylenic monomer (a) having hydroxyl is a fluorine-containing monomer represented by the formula (2):

$$CH_2=CFCF_2-R_f^1-CH_2OH \qquad (2)$$

wherein $R_f^1$ is a divalent fluorine-containing alkylene group having 1 to 39 carbon atoms or $-OR_f^2$, in which $R_f^2$ is a divalent fluorine-containing alkylene group having 1 to 39 carbon atoms or a divalent fluorine-containing alkylene group having ether bond and 1 to 39 carbon atoms.

Further it is preferable in the present invention that the above-mentioned fluorine-containing ethylenic monomer (b) having no hydroxyl is tetrafluoroethylene.

Further it is preferable in the present invention that the above-mentioned fluorine-containing ethylenic monomer (b) having no hydroxyl is a monomer mixture of 85 to 99.7% by mole of tetrafluoroethylene and 0.3 to 15% by mole of a monomer represented by the formula (3):

$$CF_2=CF-R_f^3 \qquad (3)$$

wherein $R_f^3$ is $-CF_3$ or $-OR_f^4$, in which $R_f^4$ is a perfluoroalkyl group having 1 to 5 carbon atoms.

Further it is preferable in the present invention that the above-mentioned fluorine-containing ethylenic monomer (b) having no hydroxyl is a monomer mixture comprising 40 to 80% by mole of tetrafluoroethylene or chlorotrifluoroethylene, 20 to 60% by mole of ethylene and 0 to 15% by mole of other monomer copolymerizable with those monomers.

Further it is preferable in the present invention that the above-mentioned fluorine-containing ethylenic monomer (b) having no hydroxyl is vinylidene fluoride.

Further it is preferable in the present invention that the above-mentioned fluorine-containing ethylenic monomer (b) having no hydroxyl is a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene and 1 to 20% by mole of chlorotrifluoroethylene or a monomer mixture comprising 60 to 99% by mole of vinylidene fluoride, 0 to 30% by mole of tetrafluoroethylene and 1 to 10% by mole of hexafluoropropylene.

Further the present invention relates to a fluorine-containing adhesive film obtained by molding any one of the above-mentioned fluorine-containing adhesives comprising a fluorine-containing ethylenic polymer having hydroxyl.

Further it is preferable in the present invention that the fluorine-containing adhesive film is one obtained by melt-molding any one of the above-mentioned fluorine-containing adhesives.

Further it is preferable in the present invention that the adhesive film is produced by laminating: a layer of any one of (A-1) the above-mentioned adhesive comprising a fluorine-containing ethylenic polymers having hydroxyl and a layer of (B-1) a fluorine-containing polymer having no functional group in its branched chain.

Further it is preferable in the present invention that the above-mentioned fluorine-containing polymer (B-1) having no functional group in its branched chain is at least one selected from the group consisting of polytetrafluoroethylene, tetrafluoroethylene-perfluoro(alkyl vinyl ether) copolymer, tetrafluoroethylene-hexafluoropropylene copolymer, ethylene-tetrafluoroethylene copolymer, polyvinylidene fluoride and vinylidene fluoride copolymer.

Further it is preferable in the present invention that a layer of any one of (A-1) the above-mentioned fluorine-containing adhesives and a layer comprising (B-1) at least one selected from the group consisting of polytetrafluoroethylene, tetrafluoroethylene-perfluoro(alkyl vinyl ether) copolymer and tetrafluoroethylene-hexafluoropropylene copolymer are laminated.

Further it is preferable in the present invention that a layer of (A-1) the above-mentioned fluorine-containing adhesive and a layer comprising (B-1) ethylene-tetrafluoroethylene copolymer or ethylene-chlorotrifluoroethylene copolymer are laminated.

Further it is preferable in the present invention that a layer of (A-1) the above-mentioned fluorine-containing adhesive and a layer comprising (B-1) polyvinylidene fluoride or vinylidene fluoride copolymer are laminated.

Further the present invention relates to a laminated article comprising a layer of any one of (A-2) the above-mentioned fluorine-containing adhesives and a layer of (C-1) an inorganic material.

Further it is preferable in the present invention that the laminated article comprises a layer of any one of (A-3) the above-mentioned fluorine-containing adhesives and a layer of (D-1) an organic material.

Further it is preferable in the present invention that the inorganic material (C-1) is a metallic material.

Further it is preferable in the present invention that the above-mentioned metallic material is an aluminum-based metallic material.

Further it is preferable in the present invention that the above-mentioned fluorine-containing adhesive (A-2) is any one of the above-mentioned fluorine-containing adhesives.

Further it is preferable in the present invention that the above-mentioned metallic material is an iron-based metallic material.

Further it is preferable in the present invention that the above-mentioned fluorine-containing adhesive (A-2) is any one of the above-mentioned fluorine-containing adhesives.

Further it is preferable in the present invention that the above-mentioned metallic material is a copper-based metallic material.

Further it is preferable in the present invention that the above-mentioned fluorine-containing adhesive (A-2) is any one of the above-mentioned fluorine-containing adhesives.

Further it is preferable in the present invention that the above-mentioned inorganic material (C-1) is silicon-based material.

Further it is preferable in the present invention that the above-mentioned inorganic material (C-1) is glass material.

Further it is preferable in the present invention that the above-mentioned fluorine-containing adhesive (A-2) is any one of the above-mentioned fluorine-containing adhesives.

Further it is preferable in the present invention that the above-mentioned organic material (D-1) is a non-fluorine-containing polymer.

Further it is preferable in the present invention that the laminated article comprises three layers of a layer of any one of (A-4) the above-mentioned fluorine-containing adhesives, a layer of (B-2) the above-mentioned fluorine-containing ethylenic polymer having no functional group in its branched chain, and a layer of (C-2) the above-mentioned inorganic material, in which the layer of (A-4) the fluorine-containing adhesive is put between the layer of (B-2) the fluorine-containing ethylenic polymer having no functional group and the layer of (C-2) the inorganic material and forms an adhesive layer.

BEST MODE FOR CARRYING OUT THE INVENTION

Figure 1:
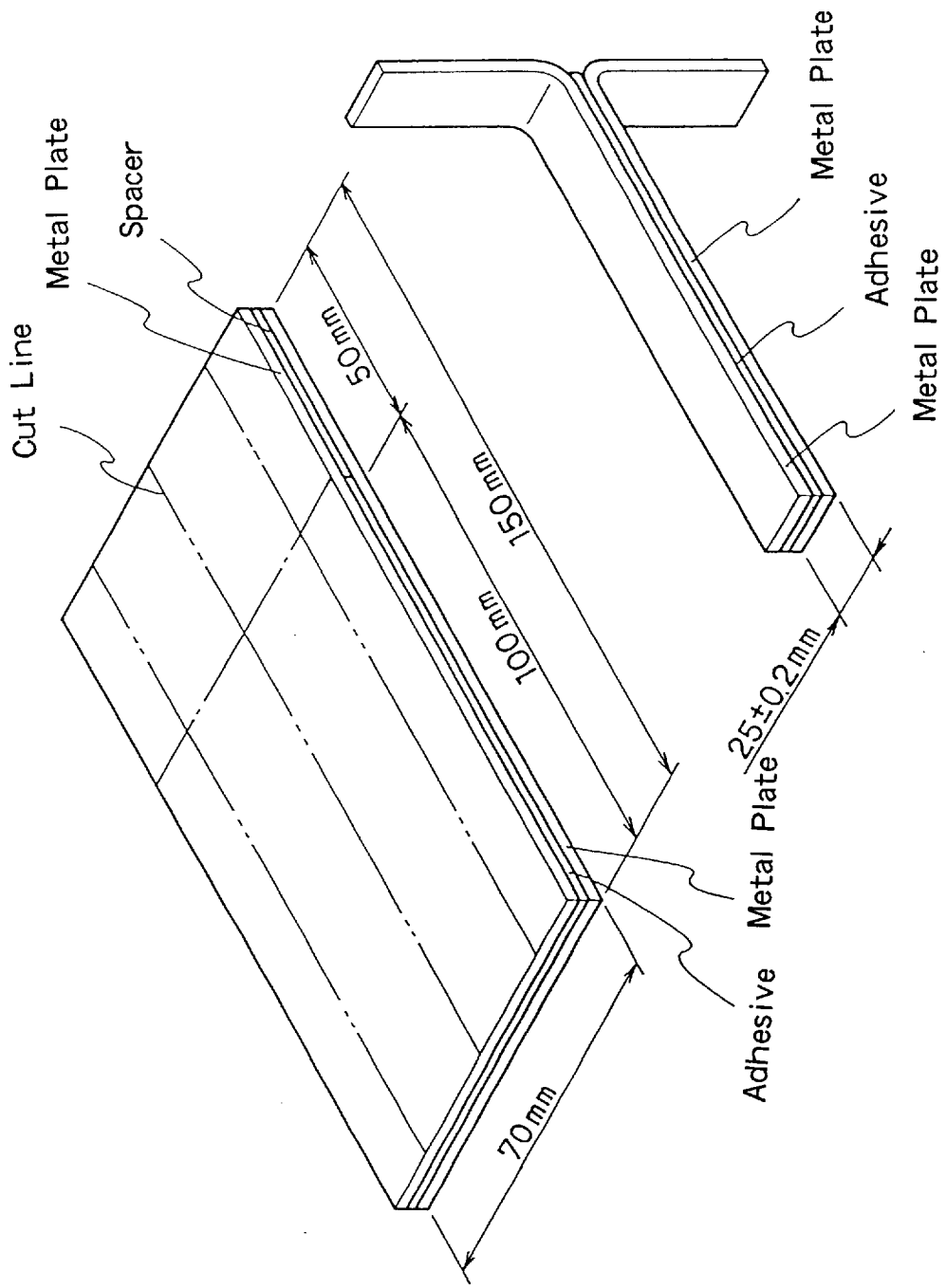
FIG. 1 is a diagrammatic view of a sample being subjected to adhesion test (peeling test) in the present invention.

The fluorine-containing ethylenic polymer used for the fluorine-containing adhesive of the present invention is a fluorine-containing ethylenic polymer having hydroxyl, particularly a fluorine-containing ethylenic polymer prepared by copolymerizing:

(a) 0.05 to 30% by mole of at least one of fluorine-containing ethylenic monomers having hydroxyl and (b) 70 to 99.95% by mole of at least one of fluorine-containing ethylenic monomers having no functional group and being copolymerizable with the component (a).

The present inventors have found that the above-mentioned fluorine-containing ethylenic polymer having hydroxyl has surprisingly strong adhesive property to metal, glass and other materials even without surface-treatment thereof which is usually carried out when a fluorine-containing resin is used.

In preparing the fluorine-containing adhesive of the present invention, it is important to copolymerize by using the above-mentioned fluorine-containing ethylenic monomer having hydroxyl (a) and introduce hydroxyl to the fluorine-containing polymer, thereby making it possible to give excellent adhesive force directly, without carrying out surface-treatment, to various materials, to which adhesion have been difficult or impossible. Namely as compared with a fluorine-containing polymer having other functional group such as carboxyl or even a fluorine-containing ethylenic polymer having hydroxyl and prepared by copolymerizing a non-fluorine-containing monomer having hydroxyl, the fluorine-containing polymer of the present invention is excellent in thermal resistance, and even if processing at high temperature is necessary, decomposition at processing can be inhibited more and a large adhesive force can be obtained. Also a laminated article being free from coloring and foaming can be obtained.

The above-mentioned fluorine-containing ethylenic polymer having hydroxyl which is used for the fluorine-containing adhesive of the present invention can maintain excellent characteristics such as not only thermal resistance thereof but also thermal resistance, chemical resistance, weather resistance, water resistance, electrical insulating property, etc. of a fluorine-containing polymer and can give such excellent characteristics which the fluorine-containing polymer possesses, to a laminated article after adhering without lowering them.

Examples of the above-mentioned fluorine-containing ethylenic polymer having hydroxyl which is used for the fluorine-containing adhesive of the present invention are fluorine-containing ethylenic polymers having hydroxyl which are prepared by copolymerizing 0.05 to 30% by mole of at least one of the monomers (a) represented by the formula (1):

$$CX_2=CX^1-R_f-CH_2OH \qquad (1)$$

wherein X and $X^1$ are the same or different and each is hydrogen atom or fluorine atom, $R_f$ is a divalent alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms, and 70 to 99.95% by mole of at least one of fluorine-containing ethylenic monomers (b) copolymerizable with the component (a).

Examples of the fluorine-containing ethylenic monomer having hydroxyl (a) are: one represented by the formula (4):

$$CF_2=CF-R_f^5-CH_2OH \quad (4)$$

wherein $R_f^5$ is a divalent fluorine-containing alkylene group having 1 to 40 carbon atoms or $-OR_f^6$, in which $R_f^6$ is a divalent fluorine-containing alkylene group having 1 to 40 carbon atoms or a divalent fluorine-containing alkylene group having ether bond and 1 to 40 carbon atoms, one represented by the formula (5):

$$CF_2=CFCF_2-OR_f^7-CH_2OH \quad (5)$$

wherein $-R_f^7$ is a divalent fluorine-containing alkylene group having 1 to 39 carbon atoms or a divalent fluorine-containing alkylene group having ether bond and 1 to 39 carbon atoms, one represented by the formula (2):

$$CH_2=CFCF_2-R_f^1-CH_2OH \quad (2)$$

wherein $-R_f^1$ is a divalent fluorine-containing alkylene group having 1 to 39 carbon atoms or $-OR_f^2$, in which $R_f^2$ is divalent fluorine-containing alkylene group having 1 to 39 carbon atoms or a divalent fluorine-containing alkylene group having ether bond and 1 to 39 carbon atoms, or one represented by the formula (6):

$$CH_2=CH-R_f^8-CH_2OH \quad (6)$$

wherein $R_f^8$ is a divalent fluorine-containing alkylene group having 1 to 40 carbon atoms.

The fluorine-containing ethylenic monomers having functional group and represented by the formulae (2) and (4) to (6) are preferable from the points that copolymerizability thereof with the fluorine-containing ethylenic monomer (b-1) is relatively good and that thermal resistance of the polymer obtained by copolymerizing is not lowered remarkably.

Among them, from the viewpoints of copolymerizability with other fluorine-containing ethylenic monomer and thermal resistance of the obtained polymer, the compounds of the formulae (4) and (2) are preferable and the compound of the formula (2) is particularly preferable.

Examples of the fluorine-containing ethylenic monomer (4) having functional group are:

$$CF_2=CFOCF_2CF_2CH_2OH, \quad CF_2=CFO(CF_2)_3CH_2OH,$$

$$CF_2=CFOCF_2CFOCF_2CF_2CH_2OH, \quad CF_2=CFCF_2CH_2OH,$$
$$\qquad\qquad\qquad |$$
$$\qquad\qquad\qquad CF_3$$

$$CF_2=CFCF_2CF_2CH_2OH,$$

and the like.

Examples of the fluorine-containing ethylenic monomer (5) having functional group are:

$$CF_2=CFCF_2OCF_2CF_2CF_2CH_2OH,$$

$$CF_2=CFCF_2OCFCFCH_2OH$$
$$\qquad\qquad |$$
$$\qquad\qquad CF_3$$

and the like.

Examples of the fluorine-containing ethylenic monomer (2) having functional group are:

$$CH_2=CFCF_2CF_2CH_2CH_2OH, \quad CH_2=CFCF_2CF_2CH_2OH$$

$$CH_2=CF-(CF_2CF_2)_2-CH_2CH_2OH$$

$$CH_2=CFCF_2OCFCH_2OH,$$
$$\qquad\qquad |$$
$$\qquad\qquad CF_3$$

$$CH_2=CFCF_2OCFCF_2OCFCH_2OH$$
$$\qquad\qquad\qquad |\qquad\quad |$$
$$\qquad\qquad\qquad CF_3\quad\;\; CF_3$$

and the like.

Examples of the fluorine-containing ethylenic monomer (6) having functional group are:

$$CH_2=CHCF_2CF_2CH_2CH_2OH$$

$$CH_2=CH-(CF_2)_4-CH_2CH_2CH_2OH,$$

$$CH_2=CH-(CF_2)_6-CH_2CH_2OH$$

and the like.

Examples of the other fluorine-containing ethylenic monomer are:

$$\qquad\qquad CF_3$$
$$\qquad\qquad |$$
$$CH_2=CHCH_2C-OH$$
$$\qquad\qquad |$$
$$\qquad\qquad CF_3$$

and the like.

In the fluorine-containing polymer used for the adhesive of the present invention, the fluorine-containing ethylenic monomer having hydroxyl (a) is copolymerized with the fluorine-containing ethylenic monomer having no hydroxyl (b) and being copolymerizable with the monomer (a).

Thereby the adhesive of the present invention can have excellent thermal resistance, chemical resistance, weather resistance, water resistance and electric insulating property which fluorine-containing polymers possess inherently, and can give the same excellent characteristics to a whole laminated article produced by using the above-mentioned fluorine-containing polymer.

Further adhesive property to usual fluorine-containing polymers having no functional group becomes good.

The fluorine-containing ethylenic monomer (b) substantially contains no hydroxyl. Examples thereof are, for instance, tetrafluoroethylene, chlorotrifluoroethylene, vinyl fluoride, vinylidene fluoride, hexafluoropropylene, hexafluoroisobutene, $$CH_2=CF-(CF_2)_n-X, \quad CH_2=CH-(CF_2)_n-X$$

wherein both X are hydrogen atom, chlorine atom or fluorine atom, both of n are an integer of 1 to 5, perfluoro(alkyl vinyl ethers), and the like.

As the adhesive of the present invention, there can be used one which contains, as the essential components, the fluorine-containing ethylenic monomer having hydroxyl (a) and the fluoroine-containing ethylenic monomer having no hydroxyl (b), and is prepared by copolymerizing an ethylenic monomer containing no fluorine as an optional component.

It is preferable that the ethylenic monomer containing no fluorine is selected from ethylenic monomers having 5 or less carbon atoms in order not to lower thermal resistance and chemical resistance. Examples thereof are ethylene, propylene, 1-butene, 2-butene, vinyl chloride, vinylidene chloride and the like.

A content of hydroxyl in the fluorine-containing ethylenic polymer having hydroxyl which is used for the fluorine-containing adhesive of the present invention is from 0.05 to 30% by mole on the basis of the total amount of the monomers in the polymer.

The content of hydroxyl is optionally selected depending on kind and shape of a substrate, purpose and application of adhesion, required adhesive force, form of adhesive and adhering method. Preferable content is from 0.05 to 20% by mole, particularly preferably from 0.1 to 10% by mole.

When the content of the hydroxyl is less than 0.05% by mole, sufficient adhesion to the surface of substrate is hardly obtained and separation easily occurs due to temperature change and penetration of chemicals. When more than 30%, thermal resistance is lowered, and there easily occur adhesion failure, coloring and foaming at processing at high temperature, or separation, coloring, foaming and elution due to decomposition during use at high temperature.

The fluorine-containing adhesive of the present invention can be in either of resinous and elastomer forms by selecting kind, combination, amount, etc. of the flourine-containing ethylenic monomer (b). Characteristics of the adhesive can be optionally selected depending on purpose and application of adhesion and purpose and application of a laminated article.

Examples of the preferable fluorine-containing ethylenic polymer having hydroxyl used for the fluorine-containing adhesive of the present invention are:

a copolymer comprising 0.05 to 30% by mole of the fluorine-containing ethylenic monomer having hydroxyl (a) and 70 to 99.95% by mole of tetrafluoroethylene (so-called polytetrafluoroethylene having hydroxyl (hydroxyl-containing PTFE));

a copolymer comprising 0.05 to 30% by mole of the fluorine-containing ethylenic monomer having hydroxyl (a) based on the total amount of monomers, and further 85 to 99.7% by mole of tetrafluoroethylene and 0.3 to 15% by mole of the monomer represented by the formula (3):

$$CF_2=CF-R_f^3 \quad (3)$$

wherein $R_f^3$ is selected from —$CF_3$ and $OR_f^4$, in which $R_f^4$ is a perfluoroalkyl group having 1 to 5 carbon atoms, based on the total amount of monomers except the monomer (a) (hydroxyl-containing tetrafluoroethylene-perfluoro(alkyl vinyl ether) copolymer (hydroxyl-containing PFA) or hydroxyl-containing tetrafluoroethylene-hexafluoropropylene copolymer (hydroxyl-containing FEP));

a copolymer comprising 0.05 to 30% by mole of the fluorine-containing ethylenic monomer having hydroxyl (a) based on the total amount of monomers, and further 40 to 80% by mole of tetrafluoroethylene or chlorotrifluoroethylene, 20 to 60% by mole of ethylene and 0 to 15% by mole of other copolymerizable monomer, based on the total amount of monomers except the monomer (a) (hydroxyl-containing ethylene-tetrafluoroethylene copolymer (hydroxyl-containing ETFE) or functional group-containing ethylene-chlorotrifluoroethylene copolymer (hydroxyl-containing ECTFE); and the like.

Examples of the other copolymerizable monomer used for hydroxyl-containing ethylene-tetrafluoroethylene copolymer or ethylene-chlorotrifluoroethylene copolymer are hexafluoropropylene, hexafluoroisobutene, $CH_2=CF—(CF_2)_nX$, $CH_2=CH—(CF_2)_nX$, wherein X is H, Cl or F, n is an integer of 1 to 5, perfluoro(alkyl vinyl ethers) and the like.

Those exemplified fluorine-containing ethylenic polymers having hydroxyl are preferable in that they are excellent particularly in thermal resistance, chemical resistance, weather resistance, electric insulating property (particularly high frequency characteristic) and non-sticking property among fluorine-containing polymers. While the above exemplified fluorine-containing polymers having no hydroxyl (PTFE, PFA, FEP, ECTFE) have excellent characteristics mentioned above, they are materials having the lowest adhesive property to other material, and are suitably demanded to be laminated with other material.

Examples of the preferable copolymer used for the adhesive of the present invention are:

a copolymer comprising 0.05 to 30% by mole of the fluorine-containing ethylenic monomer having hydroxyl (a) and 70 to 99.95% by mole of vinylidene fluoride (so-called polyvinylidene fluoride having hydroxyl (hydroxyl-containing PVDF)), a copolymer comprising 0.05 to 30% by mole of the monomer (a) based on the total amount of the monomers, and 50 to 99% by mole of vinylidene fluoride and 1 to 30% by mole of tetrafluoroethylene based on the total amount of the monomers except the monomer (a), a copolymer comprising 0.05 to 30% by mole of the monomer (a) based on the total amount of the monomers, and 60 to 99% by mole of vinylidene fluoride, 0 to 30% by mole of tetrafluoroethylene and 1 to 20% by mole of chlorotrifluoroethylene based on the total amount of the monomers except the monomer (a), a copolymer comprising 0.05 to 30% by mole of the monomer (a) based on the total amount of the monomers, and 60 to 99% by mole of vinylidene fluoride, 0 to 30% by mole of tetrafluoroethylene and 1 to 10% by mole of hexafluoropropylene based on the total amount of the monomers except the monomer (a), and the like.

Those fluorine-containing polymers having vinylidene fluoride as a main component are suitably used since they are excellent in weather resistance, can be molded and processed at low temperature and are meltable in a solvent, thus making it possible to be laminated with an organic material having not so high thermal resistance.

Examples of the preferable copolymer used for the fluorine-containing adhesive in the form of elastomer of the present invention are:

a copolymer comprising 0.05 to 30% by mole of the fluorine-containing ethylenic monomer having hydroxyl (a) based on the total amount of the monomers, and 40 to 90% by mole of vinylidene fluoride, 0 to 30% by mole of tetrafluoroethylene and 10 to 50% by mole of hexafluoropropene based on the total number of moles of the monomers except the monomer (a), a copolymer comprising 0.05 to 30% by mole of the component (a) based on the total number of moles of all the monomers, and 40 to 70% by mole of tetrafluoroethylene, 30 to 60% by mole of propylene and 0 to 20% by mole of a component copolymerizable with those monomers (for example, vinylidene fluoride, hexafluoropropylene, chlorotrifluoroethylene, perfluoro(vinyl ether), etc.) based on the total number of moles of the monomers except the monomer (a), a copolymer prepared from tetrafluoroethylene and perfluoro(vinyl ethers) and comprising 0.05 to 30% by mole of the component (a) based on the total number of moles of all the monomers, and 40 to 85% by mole of tetrafluoroethylene and 15 to 60% by mole of perfluoro (vinyl ethers) based on the total amount of the monomers except the component (a), and the like.

The fluorine-containing adhesive of the present invention can be prepared by copolymerizing the above-mentioned fluorine-containing ethylenic monomer having hydroxyl (a) and fluorine-containing ethylenic monomer having no hydroxyl (b) through known polymerization methods. Among them, radical polymerization method is employed mainly. Namely means for initiating the polymerization is not limited so as to initiate the polymerization radically. For example, the polymerization is initiated with an organic or inorganic radical initiator, heat, light or ionizing radiation. The polymerization can be carried out by solution polymerization, bulk polymerization, suspension polymerization, emulsion polymerization, etc. A molecular weight is regulated by concentration of the monomers to be polymerized, concentration of the initiator, concentration of a chain transfer agent and polymerization temperature. A composition of the copolymer to be produced can be controlled by amounts of monomers used.

The fluorine-containing adhesive of the present invention is used preferably solely for adhesion in order not to damage adhesive property, thermal resistance and chemical resistance which the adhesive possesses. To the adhesive can be admixed various fillers such as an inorganic powder, glass fiber, carbon fiber, metal oxide or carbon depending on its purpose and application in amounts not injuring its characteristics. Also in addition to the fillers, pigment, ultraviolet ray absorbent and other optional additives can be mixed to the adhesive. Separately from the additives, there can be mixed other fluorine-containing resin, thermoplastic resin, thermosetting resin, synthetic rubber, etc.

The fluorine-containing adhesive of the present invention can be used in various forms such as a powder, pellets, premolded film and sheet, molded article, aqueous dispersion and organic solvent dispersion or in an organic solvent-soluble form.

Those fluorine-containing adhesives processed into various shapes are brought into contact with other substrate and, for example, operations as keeping the heated and pressurized conditions are carried out, thereby forming good adhered state between the two substrates.

The resinous fluorine-containing adhesive of the present invention, particularly melt-moldable adhesive can be used as a molding material and formed into a molded article by conventional molding methods such as injection molding, extrusion molding, co-extrusion molding, inflation molding, coating, insert molding with a die mold, etc. Also a laminated article can be produced by the co-extrusion molding. A laminated article can also be produced by making a film or sheet and laminating it with other substrate.

In case of the fluorine-containing adhesive of the present invention in the form of elastomer, it is possible to mix a vulcanizing agent to the adhesive and vulcanize and adhere the adhesive. As the vulcanizing method, there can be employed conventional methods for fluorine-containing rubbers, such as organic peroxide vulcanizing, polyol vulcanizing and amine vulcanizing.

For example, in case of the organic peroxide vulcanizing, in order to introduce a vulcanizable moiety, a monomer containing bromine or iodine may be copolymerized with a fluorine-containing rubber or a chain transfer agent containing iodine may be used in polymerization. Also even if bromine or iodine is not used as the vulcanizable moiety, there may be used, as the vulcanizing accelerator, organic basic groups, for example, organic onium compounds such as organic tertiary ammonium salt and organic tertiary phosphonium salt; nitrogen-containing organic compounds such as amine and imine; and organic phosphoric compounds such as phosphine and phosphite. In case where bromine or iodine is introduced as the vulcanizable moiety, an unsaturated polyfunctional compound is used as a vulcanization aid. Also when the organic basic group is used as the vulcanization accelerator, a divalent metal oxide or hydroxide is used as an acid acceptor.

As the organic peroxides, there are used benzoyl peroxide, dichlorobenzoyl peroxide, dicumyl peroxide, 2,5-dimethyl-2,5-di(peroxybenzoate)hexyne-3,1,4-bis(tert-butyl peroxyisopropyl)benzene, lauroyl peroxide, tert-butylperacetate, 2,5-dimethyl-2,5-di(tert-butyl peroxy)hexyne-3,2,5-dimethyl-2,5-di(tert-butylperoxy)hexane, tert-butylperbenzoate, tert-butylperphenyl acetate, etc. As the unsaturated polyfunctional compound, there are used triallyl isocyanurate, triallyl cyanurate, trimethylolpropane trimethacrylate, polybutadiene, etc.

As the organic basic group, there are used, tetrabutylammoniumhydrogen sulfate, tetrabutylammonium bromide, 8-benzyl-1,8-diazabicyclo[5.4.0]-7-undecenium chloride, p-toluenesulfonate-1,8-diazabicyclo[5.4.0]-7-undecenium, tetrabutylphosphonium chloride, trioctyl-methylphosphonium chloride, triphenylbenzylphosphonium chloride, 1,8-diazabicyclo[5.4.0]-7-undecene, pyridine, tributylamine, triphenylphosphine, tributylphosphite, etc.

In case of the polyol vulcanization by using a polyhydroxy compound as the vulcanization agent, an organic onium compound is used as the vulcanization accelerator, and a divalent oxide or hydroxide is used as an acid acceptor. As the polyhydroxy compound, there can be used all the known compounds which are used for polyol vulcanization of a fluorine-containing rubber. Among them, aromatic polyhydroxy compound such as bisphenol AF, bisphenol A and hydroquinon are used preferably.

As the organic onium compound, there can be used all the known compounds which are used for polyol vulcanization of a fluorine-containing rubber, for example, tertiary phosphonium salts such as triphenyl-benzylphosphonium chloride and trioctylmethylphosphonium chloride; tertiary ammonium salts such as tetrabutylammonium bromide, tetrabutylammoniumhydrogen sulfate and 8-benzyl-1,8-diazabicyclo[5.4.0]-7-undecenium chloride; iminium salt; sulfonium salt; etc.

In case of the amine vulcanization by using a polyamine compound as the vulcanization agent, a divalent metal oxide or hydroxide is used as an acid acceptor. As the polyamine compound, there can be used all the known compounds which are used for amine vulcanization of a fluorine-containing rubber, for example, hexamethylenediamine, hexamethylenediaminedicarbamate, dicinnamylidenehexamethylenediamine, etc. As an acid acceptor, there are used oxides or hydroxides of magnesium, calcium, zinc and lead.

The so-obtained fluorine-containing adhesive in the form of elastomer can be adhered or laminated to other organic or inorganic material through conventional methods such as extrusion, co-extrusion, calendering, coating and insert molding with a die mold. Through these methods, there can be obtained, for example, a two-layer laminar film of the elastomer-like adhesive of the present invention and other polymer; a laminated article having three or more layers comprising the elastomer-like adhesive of the present invention as an adhesive layer and other polymer layers laminated on both sides of the adhesive layer; an inorganic material such as metal, glass and ceramics coated with the elastomer-like adhesive of the present invention; an inorganic material such as metal, glass and ceramics coated with the elastomer-like adhesive of the present invention as an adhesive layer and other polymer applied on the adhesive layer; and the like.

A variety of the above-mentioned fluorine-containing adhesives of the present invention can be used for surface-treating of a powder and as a coating.

When the fluorine-containing adhesive of the present invention is in the form of a powder, aqueous dispersion, organic solvent dispersion or in organic solvent-soluble form, it can be used as a coating composition and can be used as a primer for a fluorine-containing coating composition by utilizing adhesive property to various substrates which a polymer used for an adhesive possesses. Particularly the adhesive of claim 5 formed into an aqueous dispersion, the adhesive of claim 6 formed into an aqueous dispersion, organic solvent dispersion or powder, the adhesive of claim 7 formed into a powder, the adhesive of claim 8 formed into an organic solvent dispersion or powder and the adhesive of claim 9 formed into an aqueous dispersion, organic solvent solution or powder can be used as primers for fluorine-containing resin coatings having no hydroxyl and corresponding to the respective adhesives.

The second invention relates to a fluorine-containing adhesive film produced by molding the fluorine-containing adhesive of the present invention.

From the viewpoints of development of composite materials, rationalization and automation of adhering work, and prevention of pollution, a hot melt adhesive has been developed. However usual hot melt adhesives necessitate use of an applicator. On the contrary, an adhesive in the form of film requires no applicator and can be adhered by thermocompression bonding while being put on a substrate or between substrates, which is advantageous from the viewpoint of easy processing.

Also since a uniform adhesive layer is formed on the whole surface of substrate, uniform adhesive force can be obtained without non-uniform adhesion, and the adhesive can be applied to substrates having poor or no compatibility therewith.

The adhesive in the form of film can be cut into various shapes and waste thereof is less. Also working environment is good and the adhesive is advantageous from the viewpoint of cost.

The fluorine-containing adhesive film of the present invention has the same advantages as mentioned above.

The fluorine-containing adhesive film of the present invention is produced by molding a fluorine-containing ethylenic polymer having hydroxyl and prepared by copolymerizing:

(a) 0.05 to 30% by mole of at least any one of fluorine-containing ethylenic monomers having hydroxyl and (b) 70 to 99.95% by mole of at least any one of fluorine-containing ethylenic monomers copolymerizable with the component (a).

Even without surface treating and use of usual adhesives, the film can be adhered to various other substrates, thereby giving excellent characteristics of the fluorine-containing polymer to substrates.

It is possible to produce adhesive films from the above-mentioned various fluorine-containing adhesives depending on application, purpose, film production process and adhering method. The fluorine-containing adhesive film produced by using the adhesive of claim 5, 6, 7 or 8 is preferable since the adhesive film itself has thermal resistance, chemical resistance, mechanical properties, non-sticking property, etc.; efficient film molding represented by melt-molding can be carried out; the film has good moldability; making the film thin and uniform is possible; and it is possible to melt the film by various thermocompression bonding methods to firmly and beautifully adhere the film to various subtrates.

A thickness of the fluorine-containing adhesive film of the present invention is selected depending on purpose and application and is not particularly limited. The thickness is from 10 to 3,000 $\mu$m, preferably from 20 to 500 $\mu$m, particularly preferably from 40 to 300 $\mu$m.

In case of too thin films, special production method is required, it is difficult to handle the film at the time of adhering, wrinkling, breakage and poor appearance occur easily, and there is a case where adhesive strength, mechanical strength, chemical resistance and weather resistance become insufficient. Too thick film is disadvantageous from the viewpoints of cost and workability at the time of bonding to one unit.

The second fluorine-containing adhesive film of the present invention is a fluorine-containing adhesive film produced by laminating layers of (A-1) the fluorine-containing adhesive of claim 1 and (B-1) the fluorine-containing ethylenic polymer having no functional group in its branched chain.

Namely one surface of the film is a layer comprising a fluorine-containing ethylenic polymer having hydroxyl and has adhesive property to other substrate, and another surface of the film is a layer comprising usual fluorine-containing polymer. By bringing the surface of the fluorine-containing adhesive into contact with the substrate and adhering the adhesive to the substrate through thermocompression bonding, etc., excellent characteristics of the fluorine-containing polymer such as chemical resistance, weather resistance, anti-stain property, non-sticking property, low friction property and electrical properties (high-frequency electric insulation property) can be given to the substrate or laminated article including the substrate.

In the adhesive film of the present invention which is produced by laminating (A-1) and (B-1), examples of the preferable fluorine-containing ethylenic polymer (B-1) having no functional group in its branched chain are PTFE, PFA, FEP, ETFE, ECTFE, PVDF and vinylidene fluoride copolymer since the above-mentioned excellent characteristics of fluorine-containing polymer can be given to a substrate or a laminated article including the substrate.

With respect to the fluorine-containing adhesive film of the present invention which comprises a two-layer laminated article, various films can be selected depending on purpose, application and processing method. A preferable combination of each of the two layers is one which has good adhesive property and compatibility with each other.

Particularly it is preferable that the polymer for the layer (A-1) having adhesive property is selected from polymers which are prepared by copolymerizing the fluorine-containing ethylenic monomer having hydroxyl (a) and giving adhesive property and have the same monomer components as the fluorine-containing polymer of the layer (B-1).

Further preferable are:

i) the fluorine-containing adhesive film produced by laminating (A-1) a layer comprising the adhesive of claim 4 (so-called hydroxyl-containing PTFE) or the adhesive of claim 5 (so-called hydroxyl-containing PFA or FEP) and (B-1) a layer of at least one polymer selected from PTFE, PFA and FEP, since the film has the highest thermal resistance and excellent chemical resistance, non-sticking property, low friction property and electric insulation property, ii) the fluorine-containing adhesive film produced by laminating
(A-1) a layer comprising the adhesive of claim 6 (so-called hydroxyl-containing ETFE) and
(B-1) a layer of ETFE, since the film has excellent melt-moldability in addition to excellent thermal resistance, chemical resistance and mechanical properties, and iii) the fluorine-containing adhesive film produced by laminating
(A-1) a layer comprising at least one selected from the adhesive of claim 7 (so-called hydroxyl-containing PVDF) or the adhesive of claim 8 and
(B-1) a layer of at least one polymer selected from PVDF and vinylidene fluoride copolymer, since the film has excellent weather resistance and mold-processability.

A thickness of the two-layered fluorine-containing adhesive film of the present invention is selected depending on purpose and application, and is not limited particularly. The total thickness of the two layers is from 20 to 5,000 $\mu$m, preferably from 40 to 1,000 $\mu$m, particularly preferably from 50 to 500 $\mu$m.

A thickness of each layer is from about 5 $\mu$m to about 1,000 $\mu$m of the adhesive layer (A-1) and from about 15 $\mu$m to about 4,995 $\mu$m of the fluorine-containing polymer layer (B-1), preferably from 10 to 500 $\mu$m of the adhesive layer (A-1) and from 30 to 990 $\mu$m of the fluorine-containing polymer layer (B-1), particularly preferably from 10 to 200 $\mu$m of (A-1) and from 40 to 490 $\mu$m of (B-1).

In the present invention, to the fluorine-containing adhesive film can be optionally incorporated proper additives such as reinforcement, filler, stabilizer, ultraviolet ray absorbent, pigment, etc. in an amount not lowering characteristics of the film. Those additives make it possible to improve thermal stability, surface hardness, abrasion resistance, weather resistance, electrostatic charge, etc.

The fluorine-containing adhesive film of the present invention can be produced, depending on kind of polymers used and desired shape of the film, by various methods such as thermal melting method, extrusion method, cutting method, solvent-casting method and a method of applying a powder or an aqueous or organic solvent dispersion to form a continuous coating film.

For example, an adhesive as disclosed in claim 4 (PTFE having hydroxyl) which is difficult to be melt-molded can be molded by compression molding and extrusion molding (ram extrusion, paste extrusion, roll press, etc.). An adhesive comprising a polymer as disclosed in claim 5, 6, 7 or 8 which is melt-moldable is molded by compression molding and extrusion molding, and from the viewpoints of productivity and product quality, melt-extrusion molding is a preferable method.

Bonding of the two layers (A-1) and (B-1) of the present invention into an adhesive film can be carried out by a method of overlapping the respective molded films (A-1) and (B-1) and then compression-molding; a method of applying one adhesive on the molded film of another adhesive; and a method of carrying out film molding and bonding of films at the same time through multi-layer co-extrusion molding method; and the like method. Among them from the viewpoints of productivity and product quality, the multi-layer co-extrusion molding method is preferable.

Adhesion of the fluorine-containing adhesive film of the present invention to other substrate is achieved through thermal activation by heating, etc. Thermo-melting adhesion is further preferable. Represented examples of adhering method are heating roller method and hot press method. Also there are other methods such as high-frequency heating, microwave heating, vacuum compression (vacuum press, etc.) and pneumatic press. Those methods can be optionally selected depending on kind and shape of a substrate, condition and kind of film, etc.

As mentioned above, the fluorine-containing adhesive film of the present invention has various shapes, sizes and thicknesses available, and can be used for wide range of applications because of its excellent adhesive property to various substrates and good characteristics which a fluorine-containing polymer possesses. For example, the fluorine-containing adhesive film can be optionally applied, in the form of tube, plate, bent plate, curved plate, etc. for protection coating of exterior or interior of metal tube and bar. Examples of uses of the film are a corrosion preventive tape for winding on chemical plant piping, corrosion preventive tape for winding on a bottom of a can, corrosion preventive tape for piping on a deck of a ship, corrosion preventive tape for other pipings, applications for giving weather resistance of advertisement board, and roof, side wall of a greenhouse for agriculture, or exterior material, surface of a solar battery, etc. The film is also suitable as excellent interior material having anti-stain property. Further the film can be used for applications requiring chemical resistance such as packaging of food and chemicals.

Also the fluorine-containing adhesive film can be used for applications requiring non-sticking property and low friction property such as fixing roll and pressure roll of a copying machine, printer, etc., food processing machine, cooking apparatuses, etc.; applications requiring electrical properties such as a printed circuit board; applications requiring water repellent such as water repellent glass; applications for liquid crystal-related materials such as liquid crystal display; applications for car-related materials; etc.

The third invention relates to a laminated article produced by adhering the fluorine-containing adhesive of the present invention to a substrate.

The adhesive of the present invention which comprises a fluorine-containing polymer having hydroxyl has good adhesive property directly to substrates made of various inorganic and organic materials without surface treating of the substrate, and thus various laminated articles can be formed.

The first laminated article of the present invention comprises (A-2) an adhesive of claim 1 comprising a fluorine-containing polymer having hydroxyl and (C-1) an inorganic material.

Examples of the inorganic material are metallic material, silicon-based material, ceramic, bromine-based material, carbon-based material, etc.

The metallic materials encompass metal, an alloy of two or more metals, metal oxide, metal hydroxide, metal salts such as carbonate and sulfate, etc.

Among them, metal, metal oxide and an alloy are more preferable from the viewpoint of adhesive property.

In the laminated article of the present invention, as kinds of metallic materials (C-1) used, there are metals and metallic compounds of aluminum, iron, nickel, titanium, molybdenum, magnesium, manganese, copper, silver, lead, tin, chromiun, beryllium, tangusten and cobalt and alloys of two or more thereof which can be selected depending on purpose and application.

Examples of alloys are alloy steels such as carbon steel, Ni steel, Cr steel, Ni—Cr steel, Cr—Mo steel, stainless steel, silicon steel and permalloy; aluminum alloys such as Al—Cl, Al—Mg, Al—Si, Al—Cu—Ni—Mg and Al—Si—Cu—Ni—Mg; copper alloys such as brass, bronze, silicon bronze, silicon brass, nickel silver and nickel bronze; nickel alloys such as nickel-manganese (D nickel), nickel-aluminum (Z nickel), nickel-silicon, Monel metal, Constantan, nichrome Inconel and Hastelloy; and the like.

In order to prevent metals from corroding, metal surface may be subjected to electroplating, hot dipping, chlomizing, siliconizing, colorizing, sheradizing and thermal spraying to apply other metal thereon; phosphating to form phosphate coat; anodic oxidation or oxidization by heating to form metal oxide; and electrochemical treating.

In order to further enhance adhesive property, metal surface may be subjected to chemical conversion treatment with phosphoric acid, sulfuric acid, chromic acid, oxalic acid, etc., may be subjected to surface roughening such as sand blasting, shot blasting, grit blasting, horning, paper scratching, wire scratching, hair-line finishing, etc. or may be subjected to coloring, printing, etching, etc. in consideration of designing.

An aluminum-based metallic material, iron-based metallic material and copper-based metallic material are suitable as a material which has better adhesive property and required to give more excellent functions to a laminated article by laminating a fluorine-containing polymer layer.

Examples of the silicon-based material are glass material, monocrystal silicon, polycrystal silicon, amorphous silicon, clays, cement, etc. Among them, glass material is suitable because of its good adhesive property and from the point that excellent functions are required to be given to the glass material by laminating a fluorine-containing polymer layer.

Examples of the laminated article of the present invention having preferable combination of the fluorine-containing adhesive (A-2) and the inorganic material (C-1) are the following laminated articles.

i) A laminated article comprising:
(A-2) a fluorine-containing adhesive of claims 4, 5, 6, 7 or 8 and
(C-1) aluminum-based metallic material.

As the aluminum-based metallic material, there can be used pure aluminum, aluminum oxide, Al—Cu, Al—Si, Al—Mg, and aluminum alloys for casting and expanding such as Al—Cu—Ni—Mg, Al—Si—Cu—Ni—Mg, high tensile aluminum alloy and corrosion resisting aluminum alloy. Also there can be used aluminum or aluminum alloy subjected to anodizing with caustic soda, oxalic acid, sulfuric acid or chromic acid to form an oxide film (alumite) or surface treatment mentioned above in order to enhance corrosion resistance, surface hardening and adhesive property.

ii) A laminated article comprising:
(A-2) a fluorine-containing adhesive of claims 4, 5, 6, 7 or 8 and
(C-1) iron-based metallic material.

As the iron-based metallic material, there can be used pure iron, iron oxide, carbon steel, Ni steel, Cr steel, Ni—Cr steel, Cr—Mo steel, Ni—Cr—Mo steel, stainless steel, silicon steel, permalloy, non-magnetic steel, magnet steel, cast iron, etc.

Also there can be used materials plated with other metals, for example, hot-dip zincing steel plate, hot-dip zinc alloy-coated steel ptate, aluminum-coated steel plate, zinc-nickel-coated steel plate, zinc-aluminum-coated steel plate, etc.; materials coated with other metals by diffusion coating and thermal spraying method; materials on which oxide film is formed by chemical conversion treatment with chromic acid or phosphric acid or heat treatment; materials subjected to electric corrosion preventing treatment (for example, galvanized steel plate); etc.

The laminated articles i) and ii) can give corrosion resistance, rustpreventive property, chemical resistance, weather resistance, non-sticking property and sliding property to aluminum-based materials and iron-based materials, and are preferable from the point that they can be used for various applications such as building material, chemical plant, food processing, cooking apparatus, housing facilities, parts for electric appliances, car-related parts and OA-related parts.

Further iii) a laminated article comprising
(A-2) a fluorine-containing adhesive of claim 4 or 5 and
(C-1) a copper-based metallic material is suitable since the laminated article has low water absorbing property, gives excellent electrical properties (particularly high frequency electric insulating property) of a fluorine-containing resin to copper-based materials and can be used for applications in the electric and electronic fields such as printed circuit board for high frequency and electric and electronic parts.

iv) A laminated article comprising
(A-2) a fluorine-containing adhesive of claim 5, 6, 7 or 8 and
(C-1) a glass material has transparency, can give water repelling property, oil repelling property, antireflection property, low refracting property, etc. to the glass surface and can be used for optical parts, liquid crystal-related parts, glass for building, glass for cooking apparatus, glass for car, etc. Also this laminated article functions to prevent breakage of glass, and can be preferably used illumination-related apparatuses.

Also the laminated article comprising the fluorine-containing adhesive (A-2) of the present invention and an inorganic material (C) can be further laminated with a layer of a fluorine-containing polymer having no functional group in its branched chain on the adhesive layer.

Namely the laminated article comprises
(A-4) the fluorine-containing adhesive of claim 1,
(B-2) a fluorine-containing polymer having no functional group in its branched chain, and
(C-2) an inorganic material.

In the laminated article, a layer of the adhesive (A-4) is formed between (B-2) and (C-2). Thus excellent characteristics of the fluorine-containing polymer can be given more effectively to the inorganic material.

In this case, it is preferable that the fluorine-containing adhesive (A-4) used for the adhesive layer of the laminated article comprising the three layers has hydroxyl and is the same polymer as the fluorine-containing polymer (B-2) of the outermost layer, from the viewpoint of adhesion to each other. Examples of preferred laminated article are, for instance, i) a laminated article comprising
(A-4) an adhesive of claim 4 or 5,
(B-2) a polymer selected from PTFE, PFA or FEP, and
(C-2) an inorganic material;

ii) a laminated article comprising
(A-4) an adhesive of claim 6,
(B-2) ETFE, and
(C-2) an inorganic material; and iii) a laminated article comprising
(A-4) an adhesive of claim 7 or 8,
(B-2) a polymer selected from PVDF or VDF copolymer, and
(C-2) an inorganic material.

In the laminated article of the present invention having a layer of the inorganic material (C-1), it is possible to optionally incorporate proper additives such as a reinforcement, filler, stabilizer, ultraviolet ray absorbent and pigment into the fluorine-containing adhesive layer (A-2) and the fluorine-containing polymer layer (B-2) in amounts not injuring adhesive property and other characteristics of the fluorine-containing polymer. By incorporating those additives, it is possible to improve thermal stability, surface hardness, abrasion resistance, weather resistance and electrostatic charge and enhance other characteristics.

The second laminated article of the present invention is a laminated article comprising
(A-3) an adhesive comprising the fluorine-containing polymer having hydroxyl of claim 1 and
(D-1) an organic material excluding a fluorine-containing polymer.

Namely the fluorine-containing adhesive (A-3) of the present invention gives good adhesive property to even an organic material other than a fluorine-containing polymer by an effect of a hydroxyl group contained in the adhesive.

Examples of the organic material in the laminated article of the present invention are synthetic high polymer materials such as synthetic resin, synthetic rubber, synthetic fiber and synthetic leather; natural organic materials such as natural rubber, natural fiber, wood, paper and leather; and composite materials thereof.

Among them, laminating a layer of a non-fluorine-containing polymer material and a layer of a fluorine-containing polymer is preferable in that the both polymers supplement lacking characteristics of each and that the obtained laminated article can be used for various applications.

Examples of the non-fluorine-containing polymer are, for instance, polyester, polyamide, polyphenylenesulfide, acrylic polymers, vinyl acetate polymers, polyolefin, vinyl chloride polymers, polycarbonate, styrene polymers, polyurethane, ABS, polyimide, polyamideimide, PEEK, PES, polysulfone, PPO, polyaramide, polyacetal, polyetherimide, silicone resin, epoxy resin, phenol resin, amino resin, unsaturated polyester, cellophane, etc.

Among them, a polymer material having functional group or polar group in its molecule is preferable in view of adhesive property to the adhesive of the present invention. Further a polymer material having a high thermal resistance is preferable since it stands at a high molding temperature of a fluorine-containing resin, maintains thermal resistance of the whole laminated article and can provide a laminated article having both of excellent characteristics of a fluorine-containing polymer and features of other polymer material.

Examples of the preferred polymer materials are polyamide, polyester, polyphenylenesulfide, polycarbonate, polyimide, polyamideimide, PEEK, PES, polysulfone, PPO, polyetherimide, polyacetal, etc. Among them, particularly preferred are polyamide, polyester and polycarbonate since the polymers themselves are excellent in melt-moldability and mechanical properties and are required to impart excellent chemical resistance, solvent resistance, solvent impermeability, weather resistance, anti-stain property and optical properties (low refracting property) to a laminated article when laminated with a fluorine-containing resin layer.

In the laminated article comprising the fluorine-containing adhesive (A-3) of the present invention and an organic material (D-1), to each layer can be optionally incorporated proper reinforcement, filler, stabilizer, ultraviolet ray absorbent, pigment and other additives in amounts not injuring adhesive property and other characteristics of the fluorine-containing polymer. Use of these additives makes it possible to improve thermal stability, surface hardness, abrasion resistance, weather resistance and electrostatic charge and enhance other characteristics.

The method for producing the laminated article of the present invention is optionally selected depending on kind and form of the fluorine-containing adhesive, kind and shape of an inorganic material and kind and shape of an organic material.

For example, there can be employed a method for laminating by producing a fluorine-containing adhesive film as disclosed in claim 9 or 11 from a fluorine-containing adhesive, laying the film on an inorganic or organic material and then heating for thermal activation as mentioned above; a method for applying, to the inorganic or organic material, a fluorine-containing adhesive in the form of aqueous dispersion, organic solvent dispersion, powder or in organic solvent-soluble form and then heating for thermal activation; an insert molding method in case of the fluorine-containing adhesive being melt-moldable; a co-extrusion method when laminating layers of melt-moldable fluorine-containing adhesive and thermoplastic polymer.

The laminated article of the present invention can be molded to the forms of hose, pipe, tube, sheet, seal, gasket, packing, film, tank, roller, bottle, vessel, etc. by the above-mentioned methods.

EXAMPLE

The present invention is then explained in detail based on Reference Examples and Examples, but is not limited to them.

Preparation Example 1

Synthesis of PFA Having Hydroxyl

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 5.0 g of perfluoro-(1,1,9,9-tetrahydro-2,5-bistrifluoromethyl-3,6-dioxa-8-nonenol) (formula (7)):

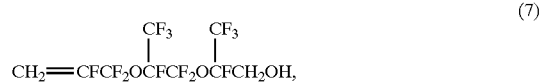

(7)

130 g of perfluoro(propyl vinyl ether) (PPVE) and 180 g of methanol were fed in the autoclave with pressurized nitrogen gas, and a temperature inside a system was maintained at 35° C.

Pressurized tetrafluoroethylene (TFE) gas was introduced into the autoclave with stirring so that the inside pressure became 8.0 kgf/cm$^2$G. Then 0.5 g of a 50% methanol solution of di-n-propyl peroxydicarbonate was fed with pressurized nitrogen gas to initiate the reaction.

Since the pressure lowered with the advance of the polymerization reaction, at the time when the pressure lowered down to 7.5 kgf/cm$^2$G, it was increased again to 8.0 kgf/cm$^2$ by feeding tetrafluoroethylene gas, and the decreasing and increasing of the pressure were repeated.

With continuing supply of tetrafluoroethylene, every time when about 60 g of tetrafluoroethylene gas was consumed after starting of the polymerization, 2.5 g of the fluorine-containing ethylenic monomer having hydroxyl (compound represented by the formula (7)) was introduced under pressure nine times (22.5 g in total) to continue the polymerization. When about 600 g of tetrafluoroethylene was consumed after starting of the polymerization, the supplying thereof was terminated, the autoclave was cooled and the un-reacted monomer and R-114 were released.

The obtained copolymer was washed and rinsed with methanol and vacuum-dried to give 710 g of a white solid. Components and their amounts of the obtained copolymer which were determined through $^{19}$F-NMR and IR analyses were TFE/PPVE/(Fluorine-containing ethylenic monomer having hydroxyl and represented by the formula (7))=97.0/2.0/1.0% by mole. In infrared spectrum, characteristic absorption of —OH was observed at 3,620 to 3,400 cm$^{-1}$. According to DSC analysis, Tm was 305° C., and according to DTGA analysis, a decomposition starting point was 365° C. and 1% thermal decomposition temperature Td was 375° C. A melt flow rate measured under conditions of preheating at 372° C. for five minutes at a load of 7 kgf/cm$^2$ by using a flow tester and nozzles of 2 mmφ×8 mm length was 32 g/10 min.

The obtained white powder was extruded at 350° to 370° C. with a double screw extruder (Laboplastomill available from Toyo Seiki Co., Ltd.) to give pellets.

Preparation Example 2

Synthesis of PFA Having Hydroxyl

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 2.5 g of perfluoro-(1,1,9,9-tetrahydro-2,5-bistrifluoromethyl-3,6-dioxa-8-nonenol) (formula (7)), 132 g of perfluoro(propyl vinyl ether) (PPVE) and 230 g of methanol were fed in the autoclave with pressurized nitrogen gas, and a temperature inside a system was maintained at 35° C.

Pressurized tetrafluoroethylene (TFE) gas was introduced into the autoclave with stirring so that the inside pressure became 8.0 kgf/cm$^2$G. Then 0.5 g of a 50% methanol solution of di-n-propyl peroxydicarbonate was fed with pressurized nitrogen gas to initiate the reaction.

Since the pressure lowered with the advance of the polymerization reaction, at the time when the pressure lowered down to 7.5 kgf/cm$^2$G, it was increased again to 8.0 kgf/cm$^2$ by feeding tetrafluoroethylene gas, and the decreasing and increasing of the pressure were repeated.

With continuing supply of tetrafluoroethylene, every time when about 60 g of tetrafluoroethylene gas was consumed after starting of the polymerization, 1.23 g of the fluorine-containing ethylenic monomer having hydroxyl (compound represented by the formula (7)) was introduced under pressure nine times (11.10 g in total) to continue the polymerization. When about 600 g of tetrafluoroethylene was consumed after starting of the polymerization, the supplying thereof was terminated, the autoclave was cooled and the un-reacted monomer and R-114 were released.

The obtained copolymer was washed and rinsed with methanol and vacuum-dried to give 680 g of a white solid. Components and their amounts of the obtained copolymer which were determined through $^{19}$F-NMR and IR analyses were TFE/PPVE/(Fluorine-containing ethylenic monomer having hydroxyl and represented by the formula (7))=97.6/2.0/0.4% by mole. In infrared spectrum, characteristic absorption of —OH was observed at 3,620 to 3,400 cm$^{-1}$. According to DSC analysis, Tm was 310° C., and according to DTGA analysis, a decomposition starting point was 368° C. and 1% thermal decomposition temperature Td was 375° C. A melt flow rate measured under conditions of preheating at 372° C. for five minutes at a load of 7 kgf/cm$^2$ by using a flow tester and nozzles of 2 mmφ×8 mm length was 42 g/10 min.

The obtained white powder was extruded at 350° to 370° C. with a double screw extruder (Laboplastomill available from Toyo Seiki Co., Ltd.) to give pellets.

Preparation Example 3

Synthesis of PFA Having no Functional Group

Synthesis was carried out in the same manner as in Preparation Example 1 except that perfluoro-(1,1,9,9-tetrahydro-2,5-bistrifluoromethyl-3,6-dioxa-8-nonenol) (compound of the formula (7)) was not used and that 240 g of methanol was used, and thus 597 g of PFA having no functional group was obtained.

PFA was analyzed in the same manner as in Preparation Example 1.

TFE/PPVE=98.2/1.8% by mole

Tm=310° C.

Td=469° C. (1% reduction of weight)

Melt flow rate: 24 g/10 min

The obtained white powder was extruded in the same manner as in Preparation Example 1 to give pellets.

Preparation Example 4

Synthesis of PFA Having Methyl Ester Group

A 6-liter autoclave lined with glass and equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 2.7 g of methyl perfluoro-(9,9-dihydro-2,5-bistrifluoromethyl-3,6-dioxa-8-nonenoate (formula 8):

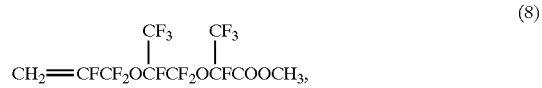

130 g of perfluoro(propyl vinyl ether) (PPVE) and 220 g of methanol were fed in the autoclave with pressurized nitrogen gas, and a temperature inside a system was maintained at 35° C.

Pressurized tetrafluoroethylene (TFE) gas was introduced into the autoclave with stirring so that the inside pressure became 8.0 kgf/cm$^2$G. Then 0.5 g of a 50% methanol solution of di-n-propyl peroxydicarbonate was fed with pressurized nitrogen gas to initiate the reaction.

Since the pressure lowered with the advance of the polymerization reaction, at the time when the pressure lowered down to 7.5 kgf/cm$^2$G, it was increased again to 8.0 kgf/cm$^2$ by feeding tetrafluoroethylene gas, and the decreasing and increasing of the pressure were repeated.

With continuing supply of tetrafluoroethylene, every time when about 60 g of tetrafluoroethylene gas was consumed after starting of the polymerization, 2.7 g of the fluorine-containing ethylenic monomer having hydroxyl (compound represented by the formula (7)) was introduced nine times (24.3 g in total) under pressure to continue the polymerization. When about 600 g of tetrafluoroethylene was consumed after starting of the polymerization, the supplying thereof was terminated, the autoclave was cooled, and the un-reacted monomer and R-114 were released.

After washed and rinsed with methanol, the obtained copolymer was vacuum-dried to give 710 g of a white solid. Components and their amounts of the obtained copolymer which were determined through $^{19}$F-NMR and IR analyses were TFE/PPVE/(Fluorine-containing ethylenic monomer having methyl ester group and represented by the formula (8))=97.8/1.0/1.2% by mole. In infrared spectrum, characteristic absorption of —COOMe was observed at 1,795 cm$^{-1}$. According to DSC analysis, Tm was 308° C., and according to DTGA analysis, 1% thermal decomposition temperature Td was 376° C. A melt flow rate measured under conditions of preheating at 372° C. for five minutes at a load of 7 kgf/cm$^2$ by using a flow tester and nozzles of 2 mmφ×8 mm length was 29 g/10 min.

Preparation Example 5

Synthesis of PFA Having Carboxyl

10 Grams of the white powder of PFA having methyl ester group and obtained in Preparation Example 4 was added to a mixed solvent comprising 600 ml of methanol and 200 ml of water, in which 40 g of NaOH was dissolved, followed by stirring at 70° to 75° C. for five hours.

After cooling, a 2N—HCl was added until pH of the solution became 2, followed by stirring for three hours.

A white powder was taken out, washed, rinsed with methanol and dried at 100° C.

Through IR analysis, an absorption of carbonyl of a carboxyl group and an absorption of a OH group was newly observed at 1,700 cm$^{-1}$ and 3,200 to 3,700 cm$^{-1}$, respectively.

Preparation Example 6

Synthesis of Fluorine-Containing Polymer by Using Non-Fluorine-Containing Monomer Having Functional Group A 1-liter stainless steel autoclave equipped with a stirrer, valve, pressure gauge and thermometer was charged with 250 g of butyl acetate, 36.4 g of vinyl pivalate (VPi), and as a non-fluorine-containing monomer having hydroxyl, 32.5 g of 4-hydroxybutyl vinyl ether (HBVE) and 4.0 g of isopropoxycarbonyl peroxide. After cooling with ice to 0° C. and replacing with nitrogen gas sufficiently, the autoclave was evacuated and charged with 47.5 g of isobutylene (IB) and 142 g of tetrafluoroethylene (TFE).

With stirring, the autoclave was heated to 40° C., reaction was carried out for 30 hours and then the reaction was terminated at the time when the inside pressure of the autoclave lowered down to less than 2.0 kg/cm$^2$. The autoclave was cooled and the un-reacted gas monomer was released, and thereby a butyl acetate solution of a fluorine-containing copolymer was obtained. A concentration of the polymer was 45%.

A fluorine-containing copolymer was taken out from the obtained butyl acetate solution of a fluorine-containing copolymer through reprecipitation method and isolated by sufficiently drying under reduced pressure. Elementary analysis of the obtained fluorine-containing copolymer through $^1$H-NMR and $^{19}$F-NMR indicated that the obtained copolymer was a copolymer comprising TFE/IB/VPi/HBVE=44/34/15/7% by mole.

Reference Example 1

Production of Film of PFA Having Hydroxyl 8.0 Grams of pellets obtained in Preparation Example 1 was put in 100 mmφ die mold which was then set on a press machine pre-set at 350° C., followed by preheating for 30 minutes and compression-molding at 70 kg/cm$^2$ for one minute to give a 0.5 mm thick film.

Reference Example 2

Production of Film of PFA Having Hydroxyl

A 0.5 mm thick film was produced in the same manner as in Reference Example 1 except that the pellets obtained in Preparation Example 2 were used.

Reference Example 3

Production of Film of PFA Having no Functional Group

A 0.5 mm thick film was produced in the same manner as in Reference Example 1 except that the pellets obtained in Preparation Example 3 were used.

Reference Example 4

Production of Film by Extruding PFA Having Hydroxyl

Pellets obtained in Preparation Example 2 were extruded at 360° to 380° C. at a roll temperature of 120° C. with a uniaxial extruder (Laboplastomill available from Toyo Seiki Co., Ltd.) to give a film of 10 cm wide×100 to 150 μm thick.

Reference Example 5

Production of Film by Extruding PFA Having no Functional Group

A film of 10 cm wide×100 to 150 μm thick was produced in the same manner as in Reference Example 4 except that the pellets obtained in Preparation Example 3 were used.

Reference Example 6

Laminated Film of Layer of PFA Having Hydroxyl and Layer of PTFE

The film of PFA having hydroxyl which was obtained in Reference Example 1 was laid on a 0.5 mm thick PTFE film, followed by compression-molding in the same manner as in Reference Example 1.

The two layers were adhered strongly.

Reference Example 7

Production of Film of PFA Having Methyl Ester Group

A 0.5 mm thick film was obtained in the same manner as in Reference Example 1 by using 8.0 g of white powder obtained in Preparation Example 4.

Examples 1 to 4

Adhesion Test of PFA Having Hydroxyl to Metal

Adhesion test of films (films of Reference Examples 1 and 2) of PFA having hydroxyl to metal plates were carried out in the following manner by using 0.5 mm thick chromadized aluminum, pure aluminum and steel plates which had been degreased. The results are shown in Table 1.

Production of Sample for Peel Test

As shown in FIG. 1, the fluorine-containing film having hydroxyl and obtained in Reference Example and a 0.1 mm thick spacer (aluminum foil) were put between the two metal plates and then set on a press machine pre-set at 350° C., followed by preheating (20 minutes) and pressing at 50 kg/cm$^2$ for one minute.

Any of the adhesive layers of the obtained laminated articles was 0.1 mm. Further the laminated article was cut to 25 mm wide and as shown in FIG. 1, a spacer portion was bent to T-shape to give a sample for peel test.

Peel Test

In accordance with the method of JIS K6854-1977, peel test was carried out by peeling in the shape of T at room temperature at a cross head speed of 50 mm/min by using Tensilon Universal Tester available from Orientec Corporation. Maximum strength value (kgf/25 mm) and minimum strength value (kgf/25 mm) are shown.

Comparative Examples 1 to 3

Adhesion Test of PFA Having no Functional Group to Metal

Production of a sample and adhesion test were carried out in the same manner as in Example 1 except that a film of PFA having no functional group which was prepared in Reference Example 3 was used instead of films of PFA having hydroxyl which were prepared in Reference Examples 1 and 2.

Examples 6 to 7

Adhesion Test of PFA Having Hydroxyl to Glass

Adhesion test of PFA having hydroxyl was carried out in the following manner by using Pyrex glass of 30×20×5 mm as a glass plate.

Further hot water resistance test and methanol dipping test of the laminated article after adhering the film were carried out. The results are shown in Table 2.

Production of Sample for Tensile Shearing Test

Figure 2:
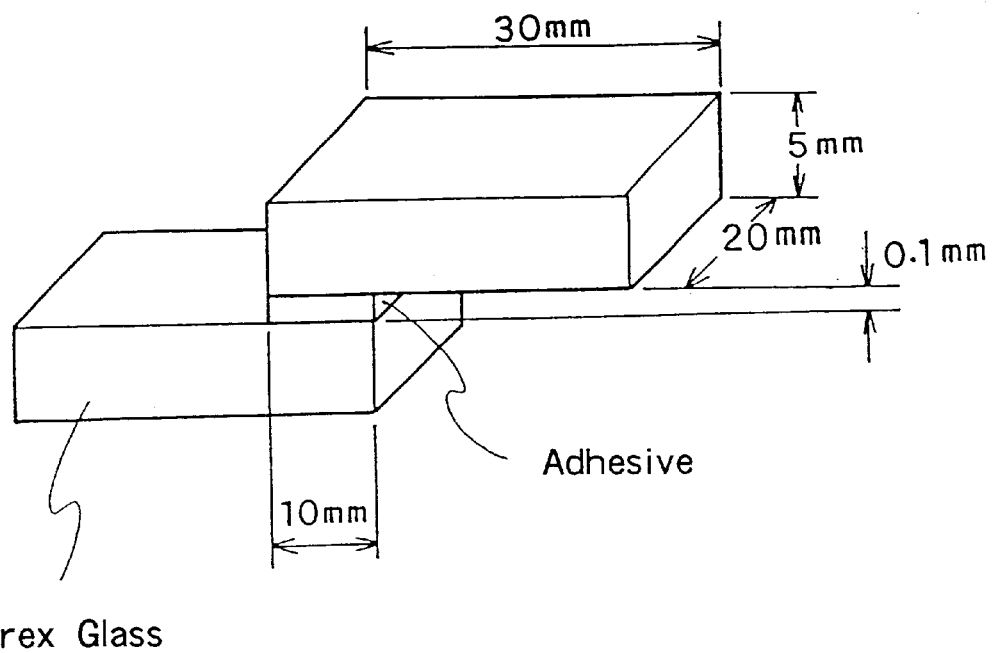
FIG. 2 is a diagrammatic view of a sample being subjected to adhesion test (tensile shearing test) in the present invention.

As shown in FIG. 2, a film (20×10 mm) of PFA having hydroxyl which was obtained in Reference Example was put between Pyrex glass plates, and a weight of 3 kg was placed thereon, followed by allowing to stand in an electric oven at 350° C. for 30 minutes to give a sample. A thickness of an adhesive layer was adjusted with a spacer to be 0.1 mm.

Adhesive Strength

Figure 3:
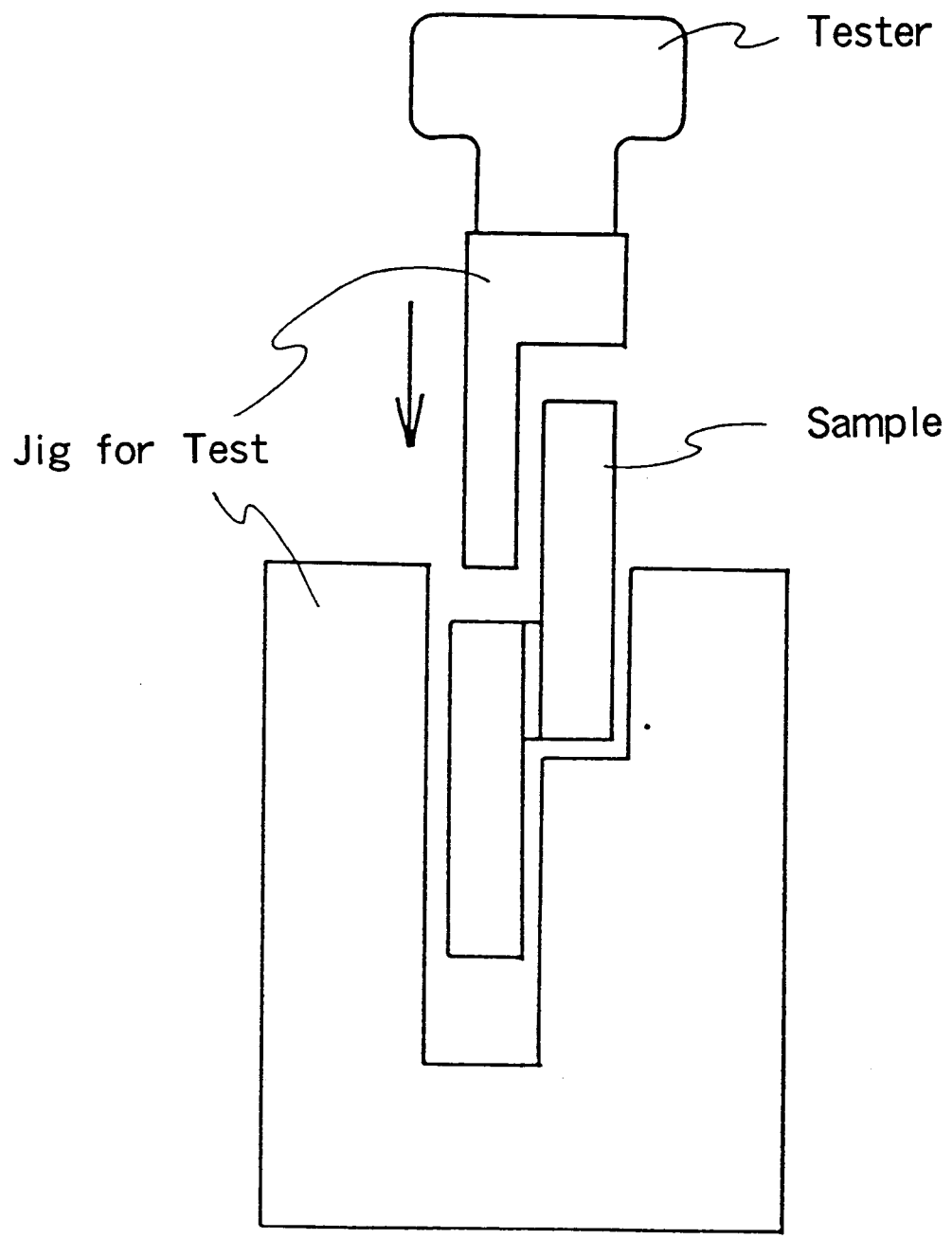
FIG. 3 is a diagrammatic view of a test device used in adhesion test (tensile shearing test) of the present invention.

An adhesive strength was measured through tensile shearing method. A jig for the test which matches the shape of the sample as shown in FIG. 3 was set on Tensilon Universal Tester available from Orientec Corporation, and the tensile shearing test was carried out at a cross head speed of 20 mm/min. The results of the measurement showed a maximum strength value (kgf/cm$^2$).

Hot Water Resistance Test

A sample produced in the manner shown above was dipped in hot water of 50° C. Adhesive property after a lapse of 6 hours was observed, and adhesive strength (kgf/cm$^2$) after a lapse of 72 hours was measured.

Methanol Dipping Test

A sample produced in the manner shown above was dipped in methanol at room temperature, and adhesive property was observed.

Comparative Example 4

Adhesion Test of PFA Having no Functional Group to Glass

Production of a sample and each test were carried out in the same manner as in Example 6 except that a film of PFA having no functional group which was prepared in Reference Example 3 was used instead of films of PFA having hydroxyl which were prepared in Reference Examples 1 and 2.

Example 8

Adhesion of PFA Having Hydroxyl to Stainless Steel

A laminated sample plate was produced in the manner mentioned below by using a degreased SUS304 steel plate of 150 mm long×70 mm wide×0.5 mm thick as a metal plate. The PFA film having hydroxyl which was prepared in Reference Example 4 and the PFA film having no functional group which was prepared in Reference Example 5 were cut to the same size as the SUS plate.

Further a polyimide film (Kapton 200-H available from E. I. Du Pont) which was used as a film for separation was cut to the same size as above.

Figure 4:
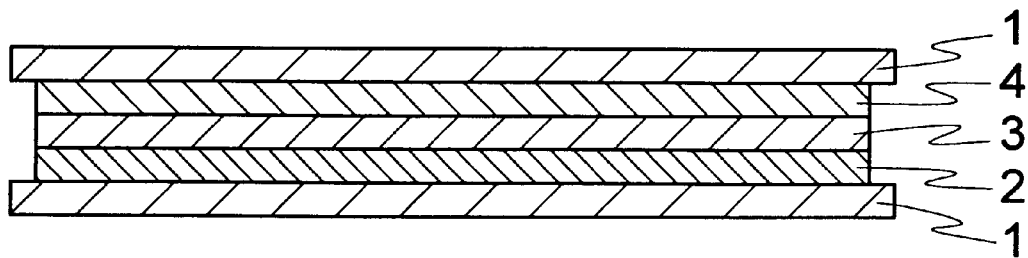
FIG. 4 is a diagrammatic cross-sectional view of a laminated test plate made in Example 8 of the present invention

Then as shown in FIG. 4, the PFA film having hydroxyl, the PFA film having no functional group and the polyimide film were put between the two SUS plates and set on a press machine preset at 350° C., followed by preheating (for 20 minutes) and then pressing at 50 kg/cm$^2$ for one minute.

After cooling, when the SUS plate (numeral 1 in FIG. 4) contacting the polyimide film was removed, the polyimide film was peeled from the PFA film having no functional group (numeral 4 in FIG. 4) spontaneously.

Figure 5:
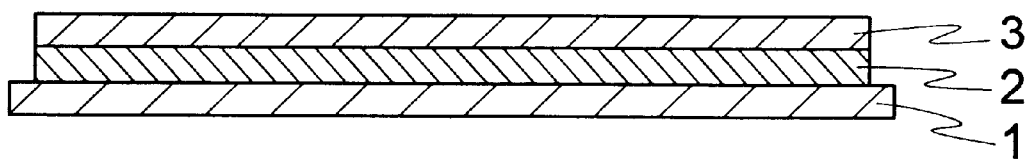
FIG. 5 is a diagrammatic cross-sectional view of a laminated PFA plate made in Example 8 of the present invention.

As a result, as shown in FIG. 5, a three-layered laminated article having good transparency and comprising the SUS plate (numeral 1 in FIG. 5), the PFA film (numeral 3 in FIG. 5) and the PFA film (numeral 2 in FIG. 5) having hydroxyl as an adhesive layer, was obtained.

Further the films on the PFA laminated article of FIG. 5 was cross-cut with a cutting knife so that a cut depth reached to the surface of the SUS plate, and a hundred pieces of 1 mm squares of lattice pattern were made. A center of the square was pushed out by 5 mm with Erichsen tester. As a result, the film was not peeled at all, and kept adhered strongly.

The PFA film exhibited strong adhesion to the SUS plate.

Comparative Example 5

Adhesion of Film of PFA Having no Functional Group to Stainless Steel

Figure 6:
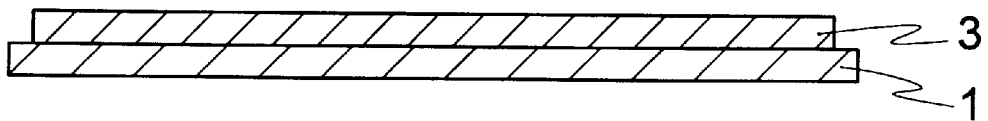
FIG. 6 is a diagrammatic cross-sectional view of a laminated SUS plate made in Comparative Example 5.

A laminated article shown in FIG. 6, which comprised a SUS plate and PFA film having no functional group, was produced in the same manner as in Example 8 except that a PFA film having hydroxyl was not used.

The film seemed to be adhered to the obtained SUS plate laminated, but could be peeled off easily.

Further Erichsen test was carried out in the same manner as in Example 8, and 60 pieces among 100 cross-cut squares were peeled from the cut line.

Example 9

Adhesion of PFA Film Having Hydroxyl to Polyimide Film

Figure 7:
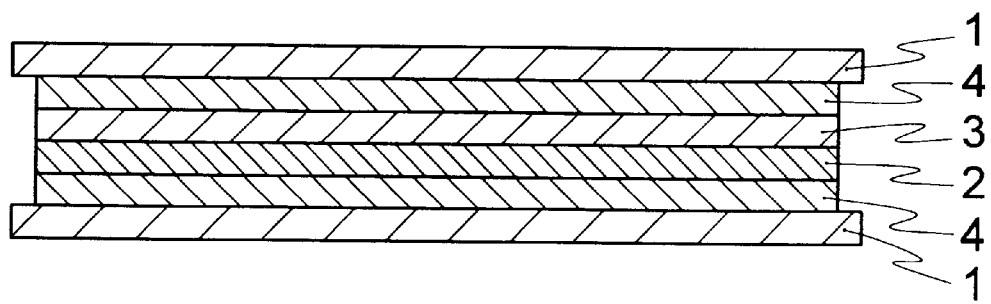
FIG. 7 is a diagramatic cross-sectional view of a test plate for making a laminated article in Example 9 of the present invention.
Figure 8:
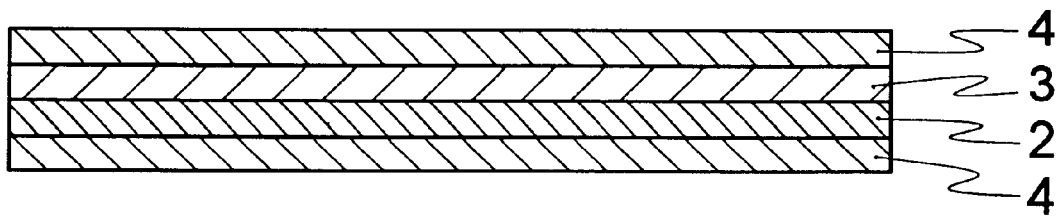
FIG. 8 is a diagrammatic cross-sectional view of a laminated article obtained in Example 9 of the present invention.

The PFA film having hydroxyl which was prepared in Reference Example 4, the PFA film having no functional group which was prepared in Reference Example 5 and the polyimide film (the same one as in Example 8) were cut to the same size as in Example 8, and put between the two SUS plates as shown in FIG. 7, followed by heating with a press machine in the same manner as in Example 8. After cooling, the SUS plate (numeral 1 in FIG. 7) was removed and a laminated article shown in FIG. 8 was obtained. The laminated article was then cut to a width of 25 mm.

Figure 9:
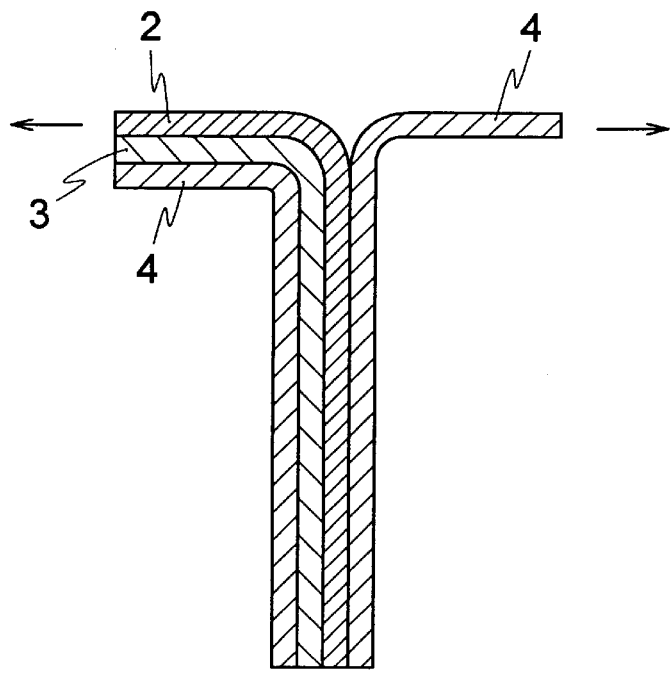
FIG. 9 is a diagrammatic cross-sectional view of a laminated article being subjected to adhesion test in Example 9 of the present invention by peeling in the shape of T.

A part of interface between the polyimide film layer (numeral 4 in FIG. 8) and the PFA film layer having hydroxyl (numeral 2 in FIG. 8) was peeled in the direction shown in FIG. 9, and thus the peel test was carried out in the same manner as in Example 1. The adhesion was 4.0 kgf/25 mm as an average value of peel according to area method.

Comparative Example 6

Adhesion of PFA Film Having no Functional Group to Polyimide Film

Figure 10:
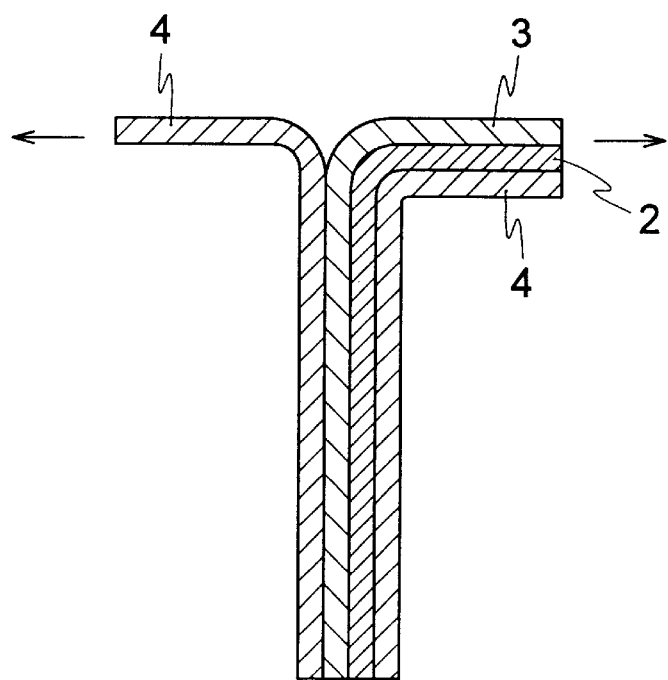
FIG. 10 is a diagrammatic cross-sectional view of a laminated article being subjected to adhesion test in Comparative Example 6 by peeling in the shape of T.

With respect to the 25 mm wide laminated article obtained in Example 9, a part of interface between the polyimide film (numeral 4 in FIG. 8) and the PFA film having no functional group was peeled in the direction shown in FIG. 10. The peel test was thus carried out in the same manner as in Example 9, and no adhesive force was exhibited.

Example 10

Adhesion of PFA Film Having Hydroxyl to Polycrystal Silicon

Figure 11:
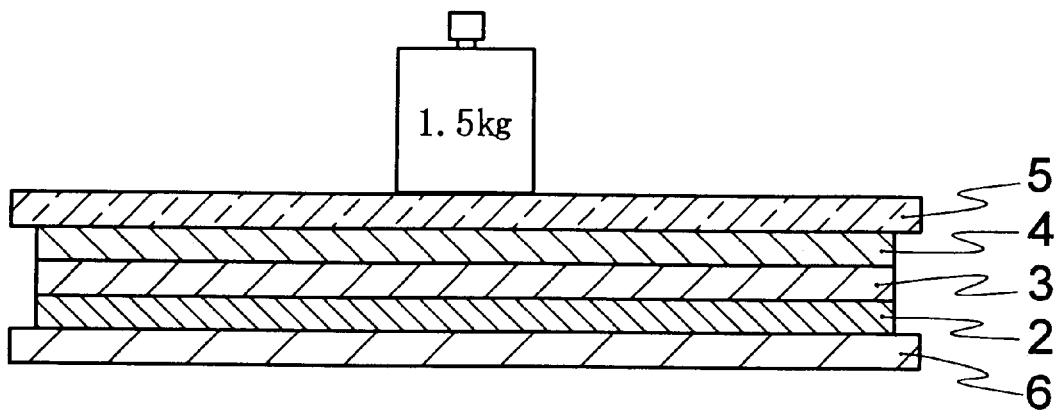
FIG. 11 is a diagrammatic cross-sectional view for explaining a method for making a sample used in Example 10 of the present invention.

As shown in FIG. 11, on a polycrystal silicon plate of 100 mm long×50 mm wide were placed the PFA film having hydroxyl (obtained in Reference Example 4), the PFA film having no functional group (obtained in Reference Example 5), the polyimide film (the same one as in Example 8) and a glass plate which had been cut to the same size as that of the silicon plate. A weight of 1.5 kg was applied on the glass plate, followed by heating at 350° C. for 20 minutes.

Figure 12:
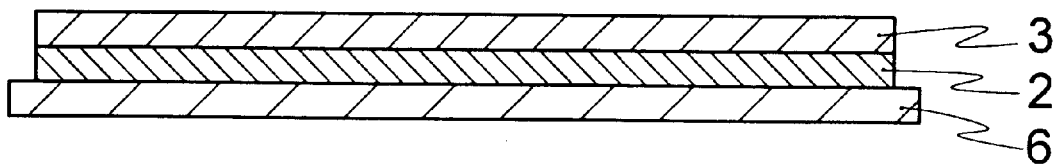
FIG. 12 is a diagrammatic cross-sectional view of a laminated article obtained in Example 10 of the present invention.

After cooling, the glass plate (numeral 5 in FIG. 11) was removed, and the polyimide film (numeral 4 in FIG. 11) was peeled. As shown in FIG. 12, a three-layered laminated article having good transparency and comprising the polycrystal silicon plate (numeral 1 in FIG. 12), the PFA film (numeral 3 in FIG. 12) and the PFA film (numeral 2 in FIG. 12) having hydroxyl as an adhesive layer, was obtained.

The PFA film exhibited strong adhesion to the polycrystal silicon plate.

Comparative Example 7

Adhesion of PFA Film Having Methyl Ester Group to Metal

Adhesion test was carried out in the same manner as in Example 1 by using the PFA film having methyl ester group (film of Reference Example 7) and a 0.5 mm thick degreased pure aluminum plate as a metal plate. A maximum strength value was 1.0 (kgf/25 mm), and desired adhesive force was not exhibited.

Comparative Example 8

Thermal Resistance of PFA Having Carboxyl

A decomposition temperature of the PFA having carboxyl which was obtained in Preparation Example 5 was measured through TGA analysis. A decomposition starting point was 257° C. and 1% thermal decomposition temperature was 335° C. It was found that thermal resistance was lower than that of PFA having hydroxyl.

Further according to DTGA analysis, a melting point Tm was 308° C. Namely it can be found that under the melt-processing conditions at a temperature of not less than the melting point, thermal decomposition starts and processing is difficult.

Comparative Example 9

Thermal Resistance of Fluorine-Containing Polymer Prepared by Using Non-Fluorine-Containing Monomer Having Functional Group Thermal decomposition temperature of the fluorine-containing copolymer obtained in Preparation Example 6 was measured through TGA analysis. A 1% thermal decomposition temperature was 220° C. It was found that the fluorine-containing copolymer as prepared by using a non-fluorine-containing monomer having functional group in Preparation Example 6 has low thermal resistance.

Further the fluorine-containing copolymer obtained in Preparation Example 6 was dissolved in butyl acetate in a concentration of 10% by weight.

The butyl acetate solution of the fluorine-containing polymer of Preparation Example 6 was coated by an air sprayer to an aluminum plate pre-treated in the same manner as in Example 1 so that a coating thickness would be about 10 µm, followed by infrared-heating at 90° C. for 10 minutes.

Figure 13:
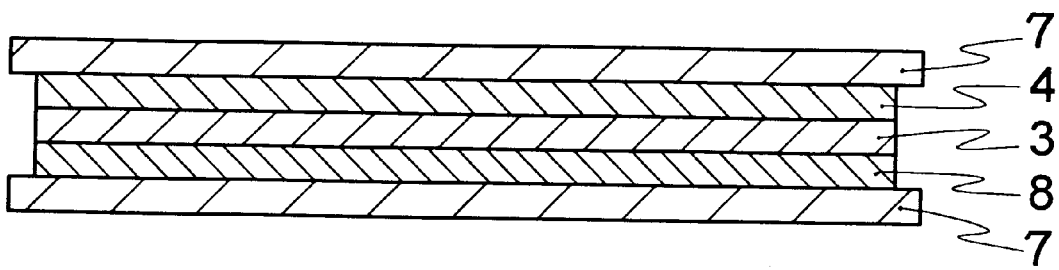
FIG. 13 is a diagrammatic cross-sectional view for explaining a method for making a test plate used in Comparative Example 9.

On the coated surface were placed in order the PFA film having no functional group which was obtained in Reference Example 5, a polyimide film for separation (same as in Example 8) and an aluminum plate (FIG. 13), followed by heating and pressing at 350° C. with a press machine in the same manner as in Example 8.

After cooling, the aluminum plate contacting the polyimide film and the polyimide film were removed.

The obtained laminated article was colored yellow-brown, and there occurred foaming and peeling between the PFA film and the aluminum plate. Thus no uniform and transparent laminated plate could be obtained.

TABLE 1

| | Example 1 | Example 2 | Comparative Example 1 | Example 3 | Comparative Example 2 | Example 4 | Comparative Example 3 |
|---|---|---|---|---|---|---|---|
| Kind of fluorine-containing adhesive | Reference Example 1 | Reference Example 2 | Reference Example 3 | Reference Example 2 | Reference Example 3 | Reference Example 1 | Reference Example 3 |
| Kind of metal plate | Chromadized aluminum | Chromadized aluminum | Chromadized aluminum | Pure aluminum | Pure aluminum | Dull-finished steel plate | Dull-finished steel plate |
| Maximum strength value (kgf/25 mm) | 15.4 | 11.3 | 1.8 | 9.5 | 1.5 | 22.4 | 2.0 |
| Minimum strength value (kgf/25 mm) | 7.2 | 2.1 | 0.18 | 2.5 | 0.15 | 12.4 | 0.20 |

TABLE 2

| | Example 6 | Example 7 | Comparative Example 4 |
|---|---|---|---|
| Kind of Fluorine-containing adhesive | Reference Example 1 | Reference Example 2 | Reference Example 3 |
| Kind of substrate | Pyrex glass | Pyrex glass | Pyrex glass |
| Adhesive strength (kgf/cm²) | 83 or more Breakage of glass | 83 or more Breakage of glass | 59 Peeling |
| Hot water resistance test (50° C.) | | | |
| After a lapse of 6 hours | Adhesive property maintained | Adhesive property maintained | Spontaneous peeling |
| Adhesive strength after a lapse of 72 hours (kgf/cm²) | 63 | 10 | — |
| Methanol dip test | | | |
| 24 hours | Adhesive property maintained | — | Spontaneous peeling |
| 72 hours | Adhesive property maintained | — | — |

Industrial Applicability

The fluorine-containing adhesive of the present invention maintains thermal resistance, chemical resistance, weather resistance and electric insulating property, exhibits strong adhesion directly to substrates, particularly metal and glass, and can be used suitably for an adhesive film and laminated article.

What is claimed is:

1. A method of adhering substrates comprising applying directly to a substrate a fluorine-containing adhesive which comprises a fluorine-containing ethylenic polymer having hydroxyl and prepared by copolymerizing:
   (a) 0.05 to 30% by mole of at least one of fluorine-containing ethylenic monomers having hydroxyl and
   (b) 70 to 99.95% by mole of at least one of fluorine-containing ethylenic monomers having no hydroxyl and being copolymerizable with the component (a), said fluorine-containing ethylenic monomer having no hydroxyl (b) being selected from the group consisting of
   (b-1) tetrafluoroethylene,
   (b-2) a monomer mixture comprising 85 to 99.7% by mole of tetrafluoroethylene and 0.3 to 15% by mole of a monomer represented by the formula (3):

$$CF_2=CF-R_f^3 \tag{3}$$

wherein $R_f^3$ is $-CF_3$ or $-OR_f^4$, in which $R_f^4$ is a perfluoroalkyl group having 1 to 5 carbon atoms,
   (b-3) a monomer mixture comprising 40 to 80% by mole of tetrafluoroethylene or chlorotrifluoroethylene, 20 to 60% by mole of ethylene, and 0 to 15% by mole of a monomer copolymerizable with those monomers,
   (b-4) vinylidene fluoride, and
   (b-5) a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene, and 1 to 20% by mole of chlorotrifluoroethylene, or a monomer mixture comprising 60 to 99% by mole of vinylidene fluoride, 0 to 30% by mole of tetrafluoroethylene, and 1 to 10% by mole of hexafluoropropylene.

2. The method of adhering substrates of claim 1, wherein the fluorine-containing ethylenic monomer having hydroxyl (a) is at least one of monomers represented by the formula (1):

$$CX_2=CX^1-R_f-CH_2OH \tag{1}$$

wherein X and $X^1$ are the same or different and each is hydrogen atom or fluorine atom, $R_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms, or a fluorine-containing oxyalkylene group having ether bond and 1 to 40 carbon atoms.

3. The method of adhering substrates of claim 1, wherein the fluorine-containing ethylenic monomer having hydroxyl (a) is a fluorine-containing monomer represented by the formula (2):

$$CH_2=CFCF_2-R_f^1-CH_2OH \tag{2}$$

wherein $R_f^1$ is a divalent fluorine-containing alkylene group having 1 to 39 carbon atoms or $-OR_f^2$, in which $R_f^2$ is a divalent fluorine-containing alkylene group having 1 to 39 carbon atoms, or a divalent fluorine-containing alkylene group having ether bond and 1 to 39 carbon atoms.

4. The method of adhering substrates of claim 1, wherein the fluorine-containing ethylenic monomer having no hydroxyl (b) is tetrafluoroethylene.

5. The method of adhering substrates of claim 1, wherein the fluorine-containing ethylenic monomer having no hydroxyl (b) is a monomer mixture comprising 85 to 99.7% by mole of tetrafluoroethylene and 0.3 to 15% by mole of a monomer represented by the formula (3):

wherein $R_f^3$ is $-OR_f^4$, in which $R_f^4$ is a perfluoroalkyl group having 1 to 5 carbon atoms.

6. The method of adhering substrates of claim 1, wherein the fluorine-containing ethylenic monomer having no hydroxyl (b) is a monomer mixture comprising 40 to 80% by mole of tetrafluoroethylene or chlorotrifluoroethylene, 20 to 60% by mole of ethylene, and 0 to 15% by mole of a monomer copolymerizable with those monomers.

7. The method of adhering substrates of claim 1, wherein the fluorine-containing ethylenic monomer having no hydroxyl (b) is vinylidene fluoride.

8. The method of adhering substrates of claim 1, wherein the fluorine-containing ethylenic monomer having no hydroxyl (b) is a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene, and 1 to 20% by mole of chlorotrifluoroethylene, or a monomer mixture comprising 60 to 99% by mole of vinylidene fluoride, 0 to 30% by mole of tetrafluoroethylene, and 1 to 10% by mole of hexafluoropropylene.

9. A method of adhering substrates of claim 1, wherein the fluorine-containing adhesive is a fluorine-containing adhesive film obtained by molding the fluorine-containing adhesive.

10. A laminated article which is a three-layered laminated article consisting essentially of:

(A-4) a layer of a fluorine-containing adhesive which comprises a fluorine-containing ethylenic polymer having hydroxyl and prepared by copolymerizing:
(a) 0.05 to 30% by mole of at least one of fluorine-containing ethylenic monomers having hydroxyl and
(b) 70 to 99.95% by mole of at least one of fluorine-containing ethylenic monomers having no hydroxyl and being copolymerizable with the component (a), said at least one of fluorine-containing ethylenic monomers having no hydroxyl (b) being selected from the group consisting of
(b-1) tetrafluoroethylene
(b-2) a monomer mixture comprising 85 to 99.7% by mole of tetrafluoroethylene and 0.3 to 15% by mole of a monomer represented by the formula (3):

wherein $R_f^3$ is $-CF_3$, or $-OR_f^4$, in which $R_f^4$ is a perfluoroalkyl group having 1 to 5 carbon atoms,
(b-3) a monomer mixture comprising 40 to 80% by mole of tetrafluoroethylene or chlorotrifluoroethylene, 20 to 60% by mole of ethylene, and 0 to 15% by mole of a monomer copolymerizable with those monomers,
(b-4) vinylidene fluoride and
(b-5) a monomer mixture comprising 70 to 99% by mole of vinylidene fluoride and 1 to 30% by mole of tetrafluoroethylene, a monomer mixture comprising 50 to 99% by mole of vinyledene fluoride, 0 to 30% by mole of tetrafluoroethylene, and 1 to 20% by mole of chlorotrifluoroethylene, or a monomer mixture comprising 60 to 99% by mole of vinylidene fluoride, 0 to 30% by mole of tetrafluoroethylene, and 1 to 10% by mole of hexafluoropropylene,
(B-2) a layer of a fluorine-containing ethylenic polymer having a branched chain which does not contain a functional group, and
(E) a substrate,
wherein the layer of the fluorine containing adhesive (A-4) is an adhesive layer and is arranged between the layer of a fluorine-containing ethylenic polymer having no functional group (B-2) and the substrate and is applied directly to substrate (E) and is applied directly to substrate (E).

11. The laminated article of claim 10, wherein the fluorine-containing ethylenic monomer having hydroxyl (a) is at least one of monomers represented by the formula (1):

wherein X and $X^1$ are the same or different and each is hydrogen atom or fluorine atom, $R_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms, or a fluorine-containing oxyalkylene group having ether bond and 1 to 40 carbon atoms.

12. The laminated article of claim 10, wherein the fluorine-containing ethylenic monomer having hydroxyl (a) is a fluorine-containing monomer represented by the formula (2):

wherein $R_f^1$ is a divalent fluorine-containing alkylene group having 1 to 39 carbon atoms or $-OR_f^2$, in which $R_f^2$ is a divalent fluorine-containing alkylene group having 1 to 39 carbon atoms, or a divalent fluorine-containing alkylene group having ether bond and 1 to 39 carbon atoms.

13. The laminated article of claim 10, wherein the fluorine-containing ethylenic monomer having no hydroxyl (b) is tetrafluoroethylene.

14. The laminated article of claim 10, wherein the fluorine-containing ethylenic monomer having no hydroxyl (b) is a monomer mixture comprising 85 to 99.7% by mole of tetrafluoroethylene and 0.3 to 15% by mole of a monomer represented by the formula (3):

wherein $R_f^3$ is $-OR_f^4$, in which $R_f^4$ is a perfluoroalkyl group having 1 to 5 carbon atoms.

15. The laminated article of claim 10, wherein the fluorine-containing ethylenic monomer having no hydroxyl (b) is a monomer mixture comprising 40 to 80% by mole of tetrafluoroethylene or chlorotrifluoroethylene, 20 to 60% by mole of ethylene, and 0 to 15% by mole of a monomer copolymerizable with those monomers.

16. The laminated article of claim 10, wherein the fluorine-containing ethylenic monomer having no hydroxyl (b) is vinylidene fluoride.

17. The laminated article of claim 10, wherein the fluorine-containing ethylenic monomer having no hydroxyl (b) is a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene, and 1 to 20% by mole of chlorotrifluoroethylene, or a monomer mixture comprising 60 to 99% by mole of vinylidene fluoride, 0 to 30% by mole of tetrafluoroethylene, and 1 to 10% by mole of hexafluoropropylene.

18. A laminated article of claim 10, wherein the fluorine-containing adhesive is a fluorine-containing adhesive film obtained by molding the fluorine-containing adhesive.

19. A method of adhering substrates comprising applying to a substrate a fluorine-containing adhesive film obtained by laminating:

(A-1) a layer of an adhesive comprising a fluorine-containing ethylenic polymer having hydroxyl and prepared by copolymerizing:
  (a) 0.05 to 30% by mole of at least one of fluorine-containing ethylenic monomers having hydroxyl and
  (b) 70 to 99.95% by mole of at least one of fluorine-containing ethylenic monomers having no hydroxyl and being copolymerizable with the component (a), said at least one of fluorine-containing ethylenic monomers having no hydroxyl (b) being selected from the group consisting of
    (b-1) tetrafluoroethylene,
    (b-2) a monomer mixture comprising 85 to 99.7% by mole of tetrafluoroethylene and 0.3 to 15% by mole of a monomer represented by the formula (3):

$$CF_2=CF-R_f^3 \qquad (3)$$

wherein $R_f^3$ is —$CF_3$, or —$OR_f^4$, in which $R_f^4$ is a perfluoroalkyl group having 1 to 5 carbon atoms,
    (b-3) a monomer mixture comprising 40 to 80% by mole of tetrafluoroethylene or chlorotrifluoroethylene, 20 to 60% by mole of ethylene, and 0 to 15% by mole of a monomer copolymerizable with those monomers,
    (b-4) vinylidene fluoride and
    (b-5) a monomer mixture comprising 70 to 99% by mole of vinylidene fluoride and 1 to 30% by mole of tetrafluoroethylene, a monomer mixture comprising 50 to 99% by mole of vinyledene fluoride, 0 to 30% by mole of tetrafluoroethylene, and 1 to 20% by mole of chlorotrifluoroethylene, or a monomer mixture comprising 60 to 99% by mole of vinylidene fluoride, 0 to 30% by mole of tetrafluoroethylene, and 1 to 10% by mole of hexafluoropropylene, and (B-1) a layer of a fluorine-containing polymer having a branched chain which does not contain a functional group, the layer (A-1) being applied directly to said substrate.

20. The method of adhering substrates of claim 19, wherein the fluorine-containing ethylenic monomer having hydroxyl (a) is at least one of monomers represented by the formula (1):

$$CX_2=CX^1-R_f-CH_2OH \qquad (1)$$

wherein X and $X^1$ are the same or different and each is hydrogen atom or fluorine atom, $R_f$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms, or a fluorine-containing oxyalkylene group having ether bond and 1 to 40 carbon atoms.

21. The method of adhering substrates of claim 17, wherein the fluorine-containing ethylenic monomer having hydroxyl (a) is a fluorine-containing monomer represented by the formula (2):

$$CH_2=CFCF_2-R_f^1-CH_2OH \qquad (2)$$

wherein $R_f^1$ is a divalent fluorine-containing alkylene group having 1 to 39 carbon atoms or —$OR_f^2$, in which $R_f^2$ is a divalent fluorine-containing alkylene group having 1 to 39 carbon atoms, or a divalent fluorine-containing alkylene group having ether bond and 1 to 39 carbon atoms.

22. The method of adhering substrates of claim 19, wherein the fluorine-containing ethylenic monomer having no hydroxyl (b) is tetrafluoroethylene.

23. The method of adhering substrates of claim 19, wherein the fluorine-containing ethylenic monomer having no hydroxyl (b) is a monomer mixture comprising 85 to 99.7% by mole of tetrafluoroethylene and 0.3 to 15% by mole of a monomer represented by the formula (3):

$$CF_2=CF-R_f^3 \qquad (3)$$

wherein $R_f^3$ is —$OR_f^4$, in which $R_f^4$ is a perfluoroalkyl group having 1 to 5 carbon atoms.

24. The method of adhering substrates of claim 19, wherein the fluorine-containing ethylenic monomer having no hydroxyl (b) is a monomer mixture comprising 40 to 80% by mole of tetrafluoroethylene or chlorotrifluoroethylene, 20 to 60% by mole of ethylene, and 0 to 15% by mole of a monomer copolymerizable with those monomers.

25. The method of adhering substrates of claim 19, wherein the fluorine-containing ethylenic monomer having no hydroxyl (b) is vinylidene fluoride.

26. The method of adhering substrates of claim 19, wherein the fluorine-containing ethylenic monomer having no hydroxyl (b) is a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene, and 1 to 20% by mole of chlorotrifluoroethylene, or a monomer mixture comprising 60 to 99% by mole of vinylidene fluoride, 0 to 30% by mole of tetrafluoroethylene, and 1 to 10% by mole of hexafluoropropylene.

27. A method of adhering substrates of claim 19, wherein the fluorine-containing adhesive is a fluorine-containing adhesive film obtained by molding the fluorine-containing adhesive.

28. A method of adhering substrates comprising applying to a substrate a fluorine-containing adhesive film produced by laminating:

(A-1) a layer of a fluorine-containing adhesive which comprises a fluorine-containing ethylenic polymer having hydroxyl and prepared by copolymerizing:
  (a) 0.05 to 30% by mole of at least one of fluorine containing ethylenic monomers having hydroxyl and
  (b) 70 to 99.95% by mole of tetrafluoroethylene, and (B-1) a layer of at least one fluorine-containing polymer selected from the group consisting of polytetrafluoroethylene, tetrafluoroethylene-perfluoro (alkyl vinyl ether) copolymer, and tetrafluoroethylene-hexafluoropropylene copolymer, the layer (A-1) being applied directly to said substrate.

29. A method of adhering substrates comprising applying to a substrate a fluorine-containing adhesive film produced by laminating:

(A-1) a layer of a fluorine-containing adhesive which comprises a fluorine-containing ethylenic polymer having hydroxyl and prepared by copolymerizing:
(a) 0.05 to 30% by mole of at least one of fluorine containing ethylenic monomers having hydroxyl and
(b) 70 to 99.95% by mole of a monomer mixture comprising 40 to 80% by mole of tetrafluoroethylene or chlorotrifluoroethylene, 20 to 60% by mole of ethylene, and 0 to 15% by mole of a monomer copolymerizable with those monomers, and (B-1) a layer of ethylene-tetrafluoroethylene copolymer or ethylene-chlorotrifluoroethylene copolymer, the layer (A-1) being applied directly to said substrate.

30. A method of adhering substrates comprising applying to a substrate a fluorine-containing adhesive film produced by laminating:
(A-1) a layer of a fluorine-containing adhesive which comprises a fluorine-containing ethylenic polymer having hydroxyl and prepared by copolymerizing:
(a) 0.05 to 30% by mole of at least one of fluorine-containing ethylenic monomers having hydroxyl and
(b) 70 to 99.95% by mole of vinylidene fluoride, and
(B-1) a layer of polyvinylidene fluoride or vinylidene fluoride copolymer, the layer (A-1) being applied directly to said substrate.

31. A method of adhering substrates comprising applying to a substrate a fluorine-containing adhesive film produced by laminating:
(A-1) a layer of a fluorine-containing adhesive which comprises a fluorine-containing ethylenic polymer having hydroxyl and prepared by copolymerizing:
(a) 0.05 to 30% by mole of at least one of fluorine-ccntaining ethylenic monomers having hydroxyl and
(b) 70 to 99.95% by mole of a monomer mixture comprising 85 to 99.7% by mole of tetrafluoroethylene and 0.3 to 15% by mole of a monomer represented by the formula (3):

$$CF_2=CF-R_f^3 \quad (3)$$

wherein $R_f^3$ is $-CF_3$, or $-OR_f^4$, in which $R_f^4$ is a perfluoroalkyl group having 1 to 5 carbon atoms, and (B-1) a layer of at least one fluorine-containing polymer selected from the group consisting of polytetrafluoroethylene, tetrafluoroethylene-perfluoro (alkyl vinyl ether) copolymer, and tetrafluoroethylene-hexafluoropropylene copolymer, the layer (A-1) being applied directly to said substrate.

32. A method of adhering substrates comprising applying to a substrate a fluorine-containing adhesive film produced by laminating:
(A-1) a layer of a fluorine-containing adhesive which comprises a fluorine-containing ethylenic polymer having hydroxyl and prepared by copolymerizing:
(a) 0.05 to 30% by mole of at least one of fluorine-ccntaining ethylenic monomers having hydroxyl and
(b) 70 to 99.95% by mole of a monomer mixture selected from the group consisting of a monomer mixture comprising 70 to 99% by mole of vinylidene fluoride and 1 to 30% by mole of tetrafluoroethylene, a monomer mixture comprising 50 to 99% by mole of vinylidene fluoride, 0 to 30% by mole of tetrafluoroethylene, and 1 to 20% by mole of chlorotrifluoroethylene, and a monomer mixture comprising 60 to 99% by mole of vinylidene fluoride, 0 to 30% by mole of tetrafluoroethylene, and 1 to 10% by mole of hexafluoropropylene, and
(B-1) a layer of polyvinylidene fluoride or vinylidene fluoride copolymer, the layer (A-1) being applied directly to said substrate.

* * * * *